(12) United States Patent
Dahme et al.

(10) Patent No.: US 12,335,379 B1
(45) Date of Patent: Jun. 17, 2025

(54) PRIVACY-PRESERVING TRANSFORMER MODEL WITH ENCRYPTED DIMENSIONALITY REDUCTION

(71) Applicant: K2 Network Labs, Inc., Dover, DE (US)

(72) Inventors: Harrison Dahme, Stateline, NV (US); Nicholas Roberts-Huntley, New York, NY (US)

(73) Assignee: K2 Network Labs, Inc., Dover, DE (US)

( * ) Notice: Subject to any disclaimer, the term of this patent is extended or adjusted under 35 U.S.C. 154(b) by 0 days.

(21) Appl. No.: 19/028,234

(22) Filed: Jan. 17, 2025

(51) Int. Cl.
*H04L 9/30* (2006.01)
*H04L 9/08* (2006.01)
*H04L 9/32* (2006.01)

(52) U.S. Cl.
CPC .............. *H04L 9/0861* (2013.01); *H04L 9/30* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 10,452,978 B2 | 10/2019 | Shazeer | |
| 10,740,433 B2 | 8/2020 | Dehghani | |
| 11,921,824 B1 | 3/2024 | Hester | |
| 12,205,575 B2 | 1/2025 | Beaufays | |
| 2019/0034919 A1* | 1/2019 | Nolan | G06Q 20/36 |
| 2020/0082226 A1 | 3/2020 | Shazeer et al. | |
| 2022/0270590 A1* | 8/2022 | Beaufays | G06N 3/084 |
| 2024/0388442 A1* | 11/2024 | Zyskind | H04L 9/3239 |

OTHER PUBLICATIONS

Zeng, C., He, D., Feng, Q., Yang, X. and Luo, Q., 2024. SecureGPT: A Framework for Multi-Party Privacy-Preserving Transformer Inference in GPT. IEEE Transaction on Information Forensics and Security. (Year: 2024).*

(Continued)

*Primary Examiner* — Luu T Pham
*Assistant Examiner* — Edward X Long
(74) *Attorney, Agent, or Firm* — CipherLaw

(57) ABSTRACT

The present disclosure provides a method for processing data using a transformer model with privacy preservation. The method includes receiving input data, applying a dimensionality reduction operation using an input privacy layer positioned horizontally between an input layer and an execution layer of the transformer model, processing the reconstructed data, generating an encryption key for encrypting weights of the input privacy layer, splitting the encryption key into shares, distributing the shares among blockchain addresses, encrypting the weights, receiving signatures from the blockchain addresses, reconstructing the encryption key using the signatures and shares, verifying the authenticity of each signature, decrypting the weights using the reconstructed key if all signatures are verified, and updating the transformer model with the decrypted weights. The input privacy layer includes down projection, transformation, and up projection operations.

30 Claims, 8 Drawing Sheets

(56) References Cited

OTHER PUBLICATIONS

Fu, X., Xiong, L., Li, F., Yang, X. and Xiong, N., 2024. Blockchain-Based Efficiently Privacy-Preserving Federated Learning Framework Using Shamir Secret Sharing. IEEE Transactions on Computer Consumer Electronics. (Year: 2024).*

A Differential Privacy Federated Learning Scheme with Improved Noise Perturbation; D.-S. Huang et al. (Eds.): ICIC 2024, LNCS 14870, pp. 61-71, 2024.

Advanced Intelligent Computing Technology and Applications; 20th International Conference, ICIC 2024 Tianjin, China, Aug. 5-8, 2024 Proceedings, Part IX.

How to keep text private? A systematic review of deep learning methods for privacy-preserving natural language processing; Know-Center GmbH, Graz, Austria; Published online: May 21, 2022.

Zhang, Z.; Ma, X.; Ma, J. Local Differential Privacy Based Membership-Privacy-Preserving Federated Learning for Deep-Learning-Driven Remote Sensing. Remote Sens. 2023, 15, 5050. https://doi.org/10.3390/rs15205050.

Measuring and Controlling Split Layer Privacy Leakage Using Fisher Information; arXiv:2209.10119v1 [cs. CR] Sep. 21, 2022.

Privacy-preserving Federated Learning and its application to natural language processing; Knowledge-Based Systems 268 (2023) 110475.

Privacy-Preserving Graph Embedding based on Local Differential Privacy; arXiv:2310.11060v2 [cs.CR] Aug. 4, 2024.

Triad of Split Learning: Privacy, Accuracy, and Performance; 2021 International Conference on Information and Communication Technology Convergence (ICTC).

U-shaped Vertical Split Learning with Local Differential Privacy for Privacy Preserving; D.-S. Huang et al. (Eds.): ICIC 2024, LNCS 14870, pp. 72-81, 2024.

Exploring Dimensionality Reduction Techniques in Multilingual Transformers; arXiv:2204.08415v1 [cs.CL] Apr. 18, 2022.

Rajput, A.R.; Li, Q.; Ahvanooey, M.T. A Blockchain-Based Secret-Data Sharing Framework for Personal Health Records in Emergency Condition. Healthcare 2021, 9, 206. https://doi.org/10.3390/healthcare9020206.

Training Text-to-Text Transformers with Privacy Guarantees; Findings of the Association for Computational Linguistics: ACL 2022, pp. 2182-2193 May 22-27, 2022.

How Does a Deep Learning Model Architecture Impact Its Privacy? A Comprehensive Study of Privacy Attacks on CNNs and Transformers; arXiv:2210.11049v3 [cs.CR] Feb. 2, 2024.

Kalian, A.D.; Benfenati, E.; Osborne, O.J.; Gott, D.; Potter, C.; Dorne, J.-L.C.M.; Guo, M.; Hogstrand, C. Exploring Dimensionality Reduction Techniques for Deep Learning Driven QSAR Models of Mutagenicity. Toxics 2023, 11, 572. https://doi.org/10.3390/toxics11070572.

DPFormer: Learning Differentially Private Transformer on Long-Tailed Data; arXiv:2305.17633v1 [cs.LG] May 28, 2023.

Differentially Private Decoding in Large Language Models; [Submitted on May 26, 2022 (v1), last revised Sep. 8, 2022 (this version, v2)].

Differentially Private Fine-tuning of Language Models; arXiv:2110.06500v2 [cs.LG] Jul. 14, 2022.

Deep learning approach based on dimensionality reduction for designing electromagnetic nanostructures; Published: Feb. 4, 2020.

Transformer-based dimensionality reduction; arXiv:2210.08288v1 [cs.CV] Oct. 15, 2022.

Yang, D.; Tsai, W.-T. An Optimized Encryption Storage Scheme for Blockchain Data Based on Cold and Hot Blocks and Threshold Secret Sharing. Entropy 2024, 26, 690. https://doi.org/10.3390/e26080690.

Privacy-Preserving Split Learning via Patch Shuffling over Transformers; 2022 IEEE International Conference on Data Mining (ICDM).

Kiya, H.; Nagamori, T.; Imaizumi, S.; Shiota, S. Privacy-Preserving Semantic Segmentation Using Vision Transformer. J. Imaging 2022, 8, 233. https://doi.org/10.3390/jimaging8090233.

Bolt: Privacy-Preserving, Accurate and Efficient Inference for Transformers; 2023.

* cited by examiner

PRIVACY-PRESERVING TRANSFORMER MODEL WITH ENCRYPTED DIMENSIONALITY REDUCTION

FIELD OF INVENTION

The present disclosure relates to privacy-preserving machine learning systems, and more particularly to a transformer model with an encrypted dimensionality reduction layer for secure and efficient data processing.

BACKGROUND

The rapid advancement of artificial intelligence (AI) and machine learning (ML) technologies has revolutionized numerous industries, from healthcare and finance to transportation and entertainment. Among these technologies, transformer models have emerged as a particularly powerful and versatile architecture, capable of processing and generating complex sequences of data with remarkable accuracy. However, the widespread adoption of transformer models in sensitive domains has raised significant concerns regarding data privacy, model security, and regulatory compliance.

Transformer models, first introduced by Vaswani et al. in 2017, rely on self-attention mechanisms to process input sequences, allowing them to capture long-range dependencies and contextual information more effectively than previous architectures. This capability has led to state-of-the-art performance in various natural language processing tasks, including machine translation, text summarization, and question answering. As the scope of transformer applications expanded, researchers and practitioners began to explore their potential in other domains, such as computer vision, speech recognition, and multimodal learning.

Despite their impressive capabilities, transformer models face several challenges that hinder their deployment in privacy-sensitive and highly regulated environments. One of the primary concerns is the potential for these models to inadvertently memorize and leak sensitive information from their training data. This risk is particularly acute in fields such as healthcare, where patient confidentiality is paramount, or in financial services, where data breaches could have severe economic consequences.

Traditional approaches to enhancing the privacy of machine learning models have focused on techniques such as differential privacy, federated learning, and homomorphic encryption. While these methods offer varying degrees of protection, they often come with significant trade-offs in terms of model performance, computational overhead, or practical implementability at scale.

Differential privacy, for instance, involves adding carefully calibrated noise to the training process or model outputs to prevent the extraction of individual data points. However, achieving strong privacy guarantees often requires adding substantial noise, which can significantly degrade model performance. Moreover, the optimal selection of privacy parameters remains a challenging problem, especially for complex transformer architectures with millions or billions of parameters.

Federated learning attempts to address privacy concerns by training models on decentralized data, with only model updates being shared between participants. While this approach keeps raw data localized, it introduces new challenges in terms of communication efficiency, model convergence, and resistance to adversarial attacks on the federated learning process itself.

Homomorphic encryption allows for computations on encrypted data, theoretically enabling the training and deployment of models without ever exposing the underlying information. However, fully homomorphic encryption schemes impose prohibitive computational and storage overheads, making them impractical for large-scale transformer models in real-world applications.

The limitations of these existing privacy-preserving techniques have led researchers to explore novel approaches that can offer robust privacy guarantees while maintaining the high performance and versatility of transformer models. One promising direction involves the integration of privacy-preserving mechanisms directly into the model architecture, rather than treating privacy as an external constraint.

In this context, the concept of dimensionality reduction as a privacy-preserving technique has gained attention. By projecting high-dimensional input data into a lower-dimensional space, it becomes possible to obscure individual features while retaining the overall structure necessary for effective model performance. However, existing implementations of dimensionality reduction in neural networks often lack the flexibility and security guarantees required for deployment in highly sensitive environments.

The challenge of secure key management in privacy-preserving machine learning systems represents another critical area of concern. Traditional key management systems often rely on centralized authorities or trusted third parties, introducing single points of failure and potential vulnerabilities to targeted attacks. The need for robust, decentralized key management solutions that can scale to the demands of large transformer models remains largely unaddressed in the current literature.

Furthermore, the encryption of neural network weights presents unique challenges not encountered in traditional cryptographic applications. The high dimensionality and frequent updates characteristic of transformer models require encryption schemes that can balance security with computational efficiency. Existing approaches to weight encryption often struggle to achieve this balance, either compromising on security or imposing unacceptable performance penalties.

The problem of secure model updates in privacy-preserving machine learning systems also remains an open challenge. As transformer models are refined and adapted to new data or tasks, there is a need for mechanisms that allow for the secure incorporation of updated weights without compromising the overall privacy and integrity of the system. Current solutions often require complex key rotation schemes or rely on trusted execution environments, limiting their practicality in diverse deployment scenarios.

In addition to these technical challenges, the deployment of transformer models in privacy-sensitive applications must also contend with an increasingly complex regulatory landscape. Data protection regulations such as the European Union's General Data Protection Regulation (GDPR) and the California Consumer Privacy Act (CCPA) impose strict requirements on the collection, processing, and storage of personal data. Ensuring compliance with these regulations while leveraging the full potential of transformer models requires novel technical solutions that can provide verifiable privacy guarantees and support fine-grained access control.

The issue of sovereign data further complicates the deployment of transformer models in global contexts. Many countries and regions have implemented data localization laws that require certain types of data to be stored and processed within their borders. These regulations pose significant challenges for organizations seeking to deploy global AI systems, as they must navigate a complex web of sometimes conflicting requirements while still maintaining the efficiency and effectiveness of their models.

The concept of data sovereignty extends beyond mere geographical restrictions, encompassing broader notions of data ownership, control, and governance. In the context of transformer models, which often require vast amounts of diverse data for training and fine-tuning, reconciling the principles of data sovereignty with the need for robust and generalizable AI systems remains a formidable challenge. Existing approaches to data federation and distributed learning have made some progress in this direction, but they often fall short in terms of performance, scalability, or the ability to provide strong privacy guarantees.

Moreover, the increasing awareness of AI ethics and the potential for algorithmic bias has led to calls for greater transparency and interpretability in machine learning models. However, these demands often stand in tension with the need for privacy and security, particularly in sensitive domains. Striking the right balance between model explainability and data protection represents a significant unsolved problem in the field of privacy-preserving machine learning.

As transformer models continue to grow in size and complexity, with architectures like GPT-3 and its successors pushing the boundaries of what is possible in natural language processing, the challenges of privacy-preserving deployment become even more acute. The computational resources required to train and operate these models often necessitate the use of cloud infrastructure, raising additional concerns about data security and sovereignty in multi-tenant environments.

In light of these multifaceted challenges, there is a pressing need for innovative solutions that can address the privacy, security, and compliance requirements of transformer models without sacrificing their remarkable capabilities. Such solutions must not only provide robust technical safeguards but also be flexible enough to adapt to evolving regulatory landscapes and diverse deployment scenarios.

The development of privacy-preserving transformer architectures that can operate effectively within the constraints of data sovereignty regulations while maintaining high performance and security standards represents a frontier in AI research and development. Addressing this challenge requires a holistic approach that combines advances in cryptography, distributed systems, and machine learning to create a new generation of AI technologies that are inherently privacy-preserving and sovereignty-aware.

As organizations across various sectors seek to harness the power of transformer models while navigating an increasingly complex landscape of privacy regulations and data sovereignty requirements, the need for comprehensive, secure, and efficient solutions has never been more urgent. The ability to deploy these powerful AI systems in a manner that respects individual privacy, complies with diverse regulatory frameworks, and maintains the integrity of sovereign data will be crucial in realizing the full potential of transformer models across a wide range of applications and industries.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a method is provided. The method includes receiving input data for processing by a transformer model. The method applies a dimensionality reduction operation to the input data using an input privacy layer positioned horizontally between an input layer and an execution layer of the transformer model. The input privacy layer comprises a down projection operation to compress the input data from a higher dimension of size N to a lower dimension of size M, where M<N, a transformation operation in the lower dimension, and an up projection operation to reconstruct the data back to the higher dimension of size N. The method processes the reconstructed data through the execution layer of the transformer model. The method generates an encryption key for encrypting weights of the input privacy layer. The method splits the encryption key into K shares using a secret sharing scheme, where K is an integer greater than 1. The method distributes the K shares among K distinct blockchain addresses. The method encrypts the weights of the input privacy layer using the encryption key. The method receives a set of T signatures corresponding to T distinct blockchain addresses from the K addresses, where T is an integer less than or equal to K and greater than or equal to a predefined threshold. The method reconstructs the encryption key using the received T signatures and their corresponding shares through polynomial interpolation. The method verifies the authenticity of each signature using the corresponding blockchain address's public key. The method decrypts the weights of the input privacy layer using the reconstructed encryption key only if all T signatures are successfully verified. The method updates the transformer model by replacing the original weights of the input privacy layer with the decrypted weights.

According to other aspects of the present disclosure, the method may include one or more of the following features. Positioning the input privacy layer horizontally between the input layer and the execution layer may comprise processing all input data through the input privacy layer before passing the reconstructed data to any subsequent layers of the transformer model. The input privacy layer positioned horizontally between the input layer and the execution layer may maintain the same input and output dimensionality as the input layer. The input privacy layer positioned horizontally between the input layer and the execution layer may be configured for applying the privacy-preserving transformations uniformly across all input features, processing batches of input data through the input privacy layer in parallel, and separating the privacy-preserving computations from the main execution logic of the transformer model. The input privacy layer may further comprise a noise addition operation applied to the compressed data in the lower dimension, the noise addition operation configured to generate Gaussian noise scaled based on a current privacy budget, add the scaled noise to the compressed data, and dynamically adjust the noise scale as the privacy budget is consumed during model training or inference. The input privacy layer may be configured to adaptively adjust the size M of the lower dimension based on a current privacy budget, a target accuracy threshold for the transformer model, and a computational resource constraint, wherein the size M is decreased to enhance privacy when the privacy budget is low or the accuracy is above the target threshold, and increased to preserve more information when the privacy budget is high or the accuracy falls below the target threshold.

The method may further include monitoring privacy metrics for the input privacy layer during training and inference, the privacy metrics including at least one of a compression ratio between N and M, a reconstruction error between the input data and the reconstructed data, a privacy budget consumption rate, and a noise magnitude added in the lower dimension. The method may adjust hyperparameters of the input privacy layer based on the monitored privacy metrics to maintain a desired privacy-utility trade-off, and store the privacy metrics and corresponding model performance data to inform future input privacy layer configurations. Generating the encryption key may comprise generating a random seed using a cryptographically secure random number generator, deriving the encryption key from the random seed using a key derivation function, and storing metadata about the key generation process in a secure enclave. Splitting the encryption key into K shares may use Shamir's Secret Sharing scheme, and may further comprise selecting a polynomial of degree T−1, where T is the predefined threshold, setting the constant term of the polynomial to be the encryption key, generating K points on the polynomial to create the K shares, and associating each share with a unique identifier.

Distributing the K shares among K distinct blockchain addresses may comprise encrypting each share using the public key of its corresponding blockchain address, transmitting the encrypted shares through a secure communication channel, storing a mapping between share identifiers and blockchain addresses in a distributed ledger, and implementing a time-lock mechanism that prevents share retrieval before a specified time. Reconstructing the encryption key may comprise verifying that the number of received signatures meets or exceeds the predefined threshold T, validating each signature using the public key of the corresponding blockchain address, retrieving the encrypted shares associated with the verified signatures, decrypting the shares using the private keys of the participating blockchain addresses, and applying Lagrange interpolation to the decrypted shares to reconstruct the original encryption key. The method may further comprise implementing a key rotation protocol for the encryption key, wherein a new encryption key is generated and split into shares at predefined intervals, the new shares are distributed to the blockchain addresses, a transition period is established where both the old and new encryption keys are valid, the weights of the input privacy layer are re-encrypted using the new encryption key, and the old encryption key and its shares are securely destroyed after the transition period.

According to another aspect of the present disclosure, a system is provided. The system includes a processor and a memory storing instructions that, when executed by the processor, cause the system to perform operations. The operations include receiving input data for processing by a transformer model, applying a dimensionality reduction operation to the input data using an input privacy layer positioned horizontally between an input layer and an execution layer of the transformer model, processing the reconstructed data through the execution layer of the transformer model, generating an encryption key for encrypting weights of the input privacy layer, splitting the encryption key into K shares using a secret sharing scheme, distributing the K shares among K distinct blockchain addresses, encrypting the weights of the input privacy layer using the encryption key, receiving a set of T signatures corresponding to T distinct blockchain addresses from the K addresses, reconstructing the encryption key using the received T signatures and their corresponding shares through polynomial interpolation, verifying the authenticity of each signature using the corresponding blockchain address's public key, decrypting the weights of the input privacy layer using the reconstructed encryption key only if all T signatures are successfully verified, and updating the transformer model by replacing the original weights of the input privacy layer with the decrypted weights.

According to other aspects of the present disclosure, the system may include one or more of the following features. The operations may be distributed across three distinct regions to comply with sovereign data requirements, further comprising performing, in an on-premises environment, storing and processing raw input data, generating initial embeddings from the raw input data, and applying preliminary privacy-preserving transformations to the initial embeddings; executing, in a sovereign-compliant regional environment, receiving the privacy-preserved embeddings from the on-premises environment, applying the dimensionality reduction operation using the input privacy layer, processing the reconstructed data through at least a portion of the execution layer, generating the encryption key for the input privacy layer weights, splitting the encryption key into K shares, encrypting the weights of the input privacy layer, and storing the encrypted weights and key shares; and conducting, in a separate cloud environment not controlled by the sovereign entity, receiving the processed data from the sovereign-compliant regional environment, completing any remaining execution layer processing, distributing the K shares among K distinct blockchain addresses, collecting the set of T signatures from the blockchain addresses, reconstructing the encryption key using the received signatures and shares, verifying the authenticity of each signature, decrypting the weights of the input privacy layer, and updating the transformer model with the decrypted weights. The system may further comprise a network interface configured to communicate with the blockchain addresses, and a secure hardware element configured to store cryptographic keys and perform cryptographic operations.

According to another aspect of the present disclosure, a non-transitory computer-readable medium is provided. The non-transitory computer-readable medium stores instructions that, when executed by a processor, cause the processor to perform operations. The operations include receiving input data for processing by a transformer model, applying a dimensionality reduction operation to the input data using an input privacy layer positioned horizontally between an input layer and an execution layer of the transformer model, processing the reconstructed data through the execution layer of the transformer model, generating an encryption key for encrypting weights of the input privacy layer, splitting the encryption key into K shares using a secret sharing scheme, distributing the K shares among K distinct blockchain addresses, encrypting the weights of the input privacy layer using the encryption key, receiving a set of T signatures corresponding to T distinct blockchain addresses from the K addresses, reconstructing the encryption key using the received T signatures and their corresponding shares through polynomial interpolation, verifying the authenticity of each signature using the corresponding blockchain address's public key, decrypting the weights of the input privacy layer using the reconstructed encryption key only if all T signatures are successfully verified, and updating the transformer model by replacing the original weights of the input privacy layer with the decrypted weights.

According to other aspects of the present disclosure, the non-transitory computer-readable medium may include one or more of the following features. The operations may further comprise monitoring privacy metrics for the input privacy layer during training and inference, adjusting hyperparameters of the input privacy layer based on the monitored privacy metrics to maintain a desired privacy-utility trade-off, and storing the privacy metrics and corresponding model performance data to inform future input privacy layer configurations. The operations may further comprise implementing a key rotation protocol for the encryption key. The input privacy layer may be configured to adaptively adjust the size M of the lower dimension based on a current privacy budget, a target accuracy threshold for the transformer model, and a computational resource constraint. The operations may further comprise generating a random seed using a cryptographically secure random number generator, deriving the encryption key from the random seed using a key derivation function, and storing metadata about the key generation process in a secure enclave.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

Figure 2:
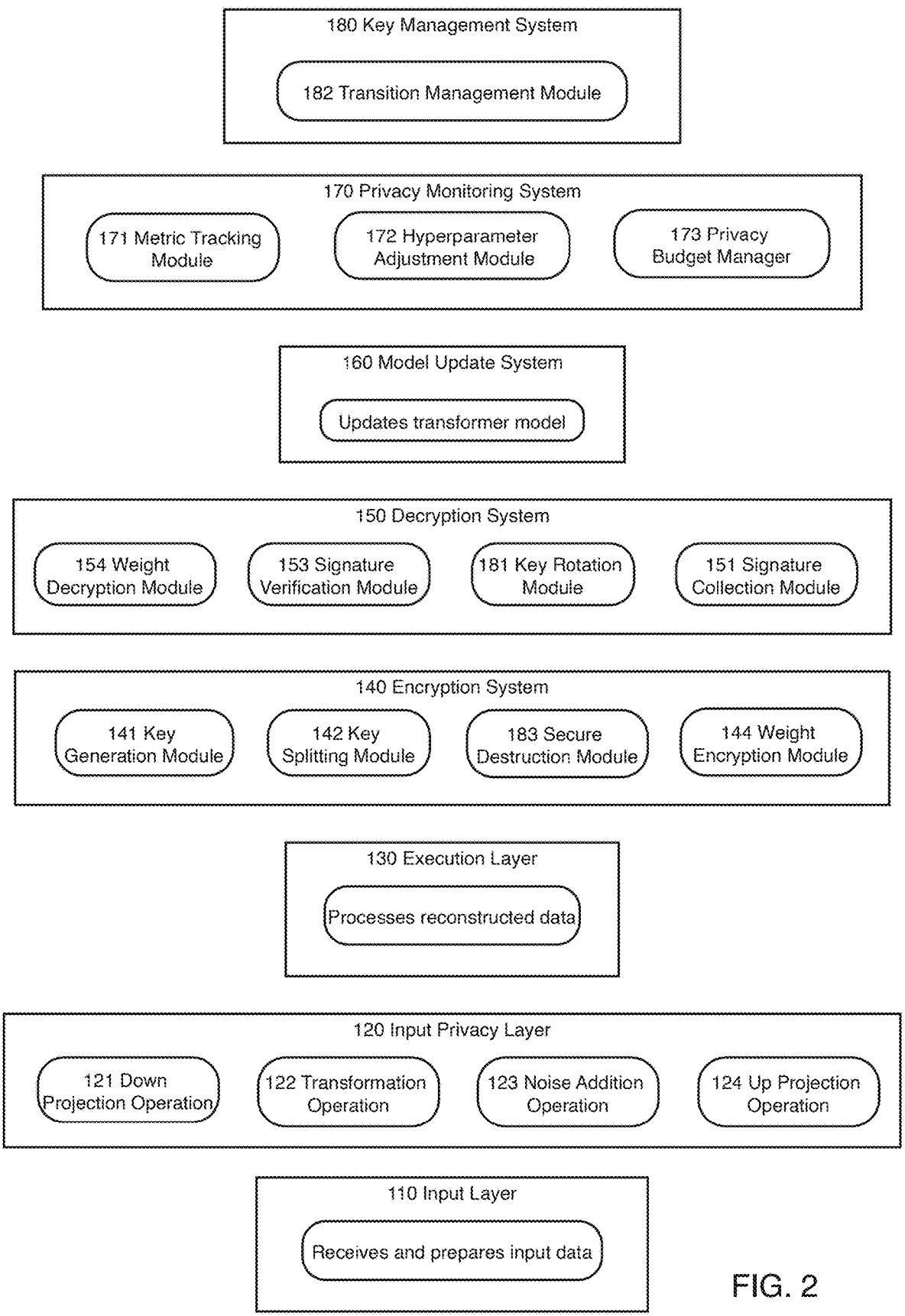
FIG. 2 illustrates a block diagram of a privacy-preserving transformer model system, in accordance with example embodiments.

The privacy-preserving transformer model system 100, as illustrated in FIG. 2, may provide a comprehensive architecture for processing data while maintaining privacy and security. The system 100 may comprise a processor and a memory storing instructions for executing various components and operations.

At the core of the system 100, an input layer 110 may receive and prepare input data for processing. The input data may then be passed to an input privacy layer 120, which may be positioned horizontally between the input layer 110 and an execution system 130. This input privacy layer 120 may perform dimensionality reduction operations to enhance privacy while preserving essential information.

The input privacy layer 120 may include several components: a down projection module 121, a transformation operation module 122, a noise addition module 123, and an up projection module 124. These modules may work in concert to compress the input data, apply transformations, add noise for privacy, and reconstruct the data before passing it to the execution system 130.

After processing by the execution system 130, the system 100 may employ an encryption system 140 to secure the weights of the input privacy layer 120. The encryption system 140 may include a key generation module 141 for creating encryption keys, a key splitting module 142 for dividing the keys into shares, and a weight encryption module 144 for encrypting the layer weights.

To ensure secure key management and access control, the system 100 may include a network interface configured to communicate with blockchain addresses. This network interface may facilitate the distribution of key shares and collection of signatures for key reconstruction.

A decryption system 150 may be responsible for securely reconstructing the encryption key and decrypting the input privacy layer weights. The decryption system 150 may comprise a signature collection module 151, a signature verification module 153, and a weight decryption module 154.

For enhanced security, the system 100 may incorporate a secure hardware element configured to store cryptographic keys and perform cryptographic operations. This secure hardware element may provide an additional layer of protection for sensitive cryptographic processes.

The system 100 may also include a model update system 160 for incorporating the decrypted weights into the transformer model, ensuring that the model remains up-to-date while maintaining privacy safeguards.

To monitor and maintain privacy levels, the system 100 may employ a privacy monitoring system 170. This system may include a metrics tracking module 171, a hyperparameter adjustment module 172, and a privacy budget module 173. These components may work together to assess privacy metrics, adjust model parameters, and manage the privacy budget throughout the system's operation.

Lastly, a key management system 180 may oversee the lifecycle of encryption keys, including key rotation and secure destruction of outdated keys. This system may include a key rotation module 181, a transition management module 182, and a secure destruction module 183.

The privacy-preserving transformer model system 100 may thus provide a comprehensive framework for processing data with strong privacy guarantees, leveraging advanced cryptographic techniques and blockchain technology to ensure the security and integrity of the model and its operations.

Figure 1:
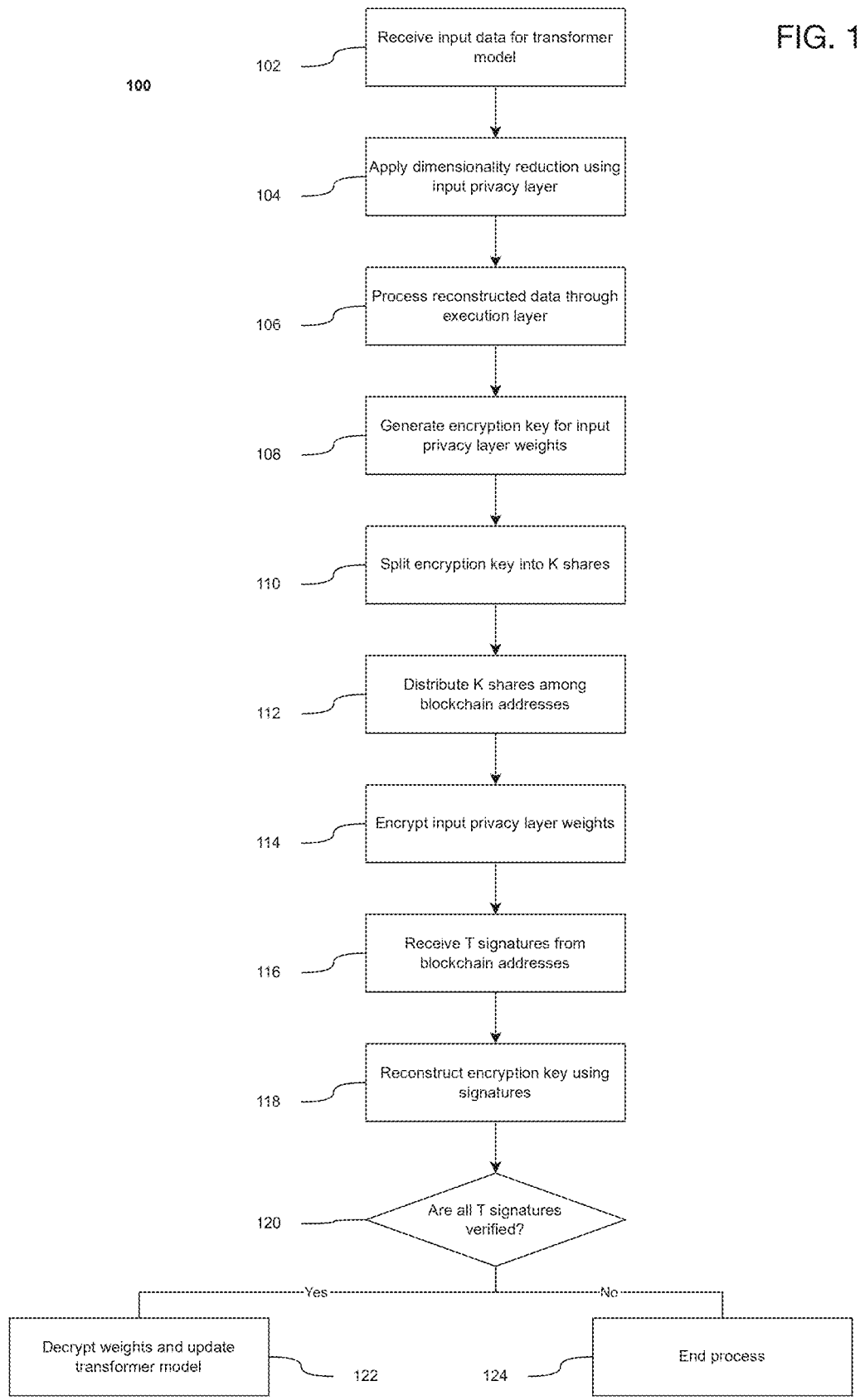
FIG. 1 illustrates a flowchart of a method for processing data using a transformer model with privacy preservation, according to aspects of the present disclosure.

The input layer and data reception process form the initial stage of the transformer model's operation. FIG. 1 illustrates a flowchart of a method 100 for processing data using a transformer model with privacy preservation. The method 100 begins at a step 102, where input data is received for processing by the transformer model. This input data may comprise various types of information, such as text, numerical values, or other forms of structured or unstructured data.

In some cases, the input data may be preprocessed before being fed into the transformer model. This preprocessing may involve tokenization, normalization, or other data cleaning techniques to ensure the input is in a suitable format for the model to process effectively.

FIG. 2 depicts a block diagram of a privacy-preserving transformer model system 100, which includes an input layer 110. The input layer 110 may be responsible for receiving and preparing the input data for subsequent processing. In some cases, the input layer 110 may perform initial transformations or encodings on the raw input data to convert it into a format that is compatible with the transformer model's architecture.

The input layer 110 may also be responsible for handling various data types and structures. For instance, in the case of natural language processing tasks, the input layer 110 may convert text into numerical representations or embeddings. In image processing applications, the input layer 110 may normalize pixel values or apply initial convolutional operations.

In some cases, the input layer 110 may incorporate mechanisms for handling batch processing, allowing multiple inputs to be processed simultaneously. This batch processing capability may enhance the efficiency of the transformer model, particularly when dealing with large volumes of data.

The input layer 110 may also implement data validation checks to ensure the integrity and consistency of the incoming data. These checks may include verifying data formats, detecting missing values, or identifying outliers that could potentially affect the model's performance.

In some implementations, the input layer 110 may be designed to handle streaming data, allowing for real-time or near-real-time processing of incoming information. This capability may be particularly useful in applications that require continuous monitoring or rapid response to changing data patterns.

The process of receiving input data, as illustrated in step 102 of FIG. 1, may involve various data ingestion mechanisms. These mechanisms may include direct API calls, database queries, file system operations, or network communications, depending on the specific deployment environment and data sources of the transformer model.

In some cases, the input layer 110 may incorporate caching mechanisms to optimize the processing of frequently accessed or repetitive input data. This caching may reduce the computational overhead associated with repeated preprocessing of similar inputs.

The input layer 110 may also be responsible for managing the flow of data to subsequent layers of the transformer model, ensuring a smooth and efficient pipeline for data processing. This management may involve buffering, queueing, or other flow control mechanisms to regulate the rate at which data is fed into the model.

The input privacy layer 120, as illustrated in FIG. 2, may be positioned horizontally between an input layer and the execution system 130 of the transformer model. This horizontal positioning may allow the input privacy layer 120 to process all input data before passing the reconstructed data to any subsequent layers of the transformer model.

Figure 3:
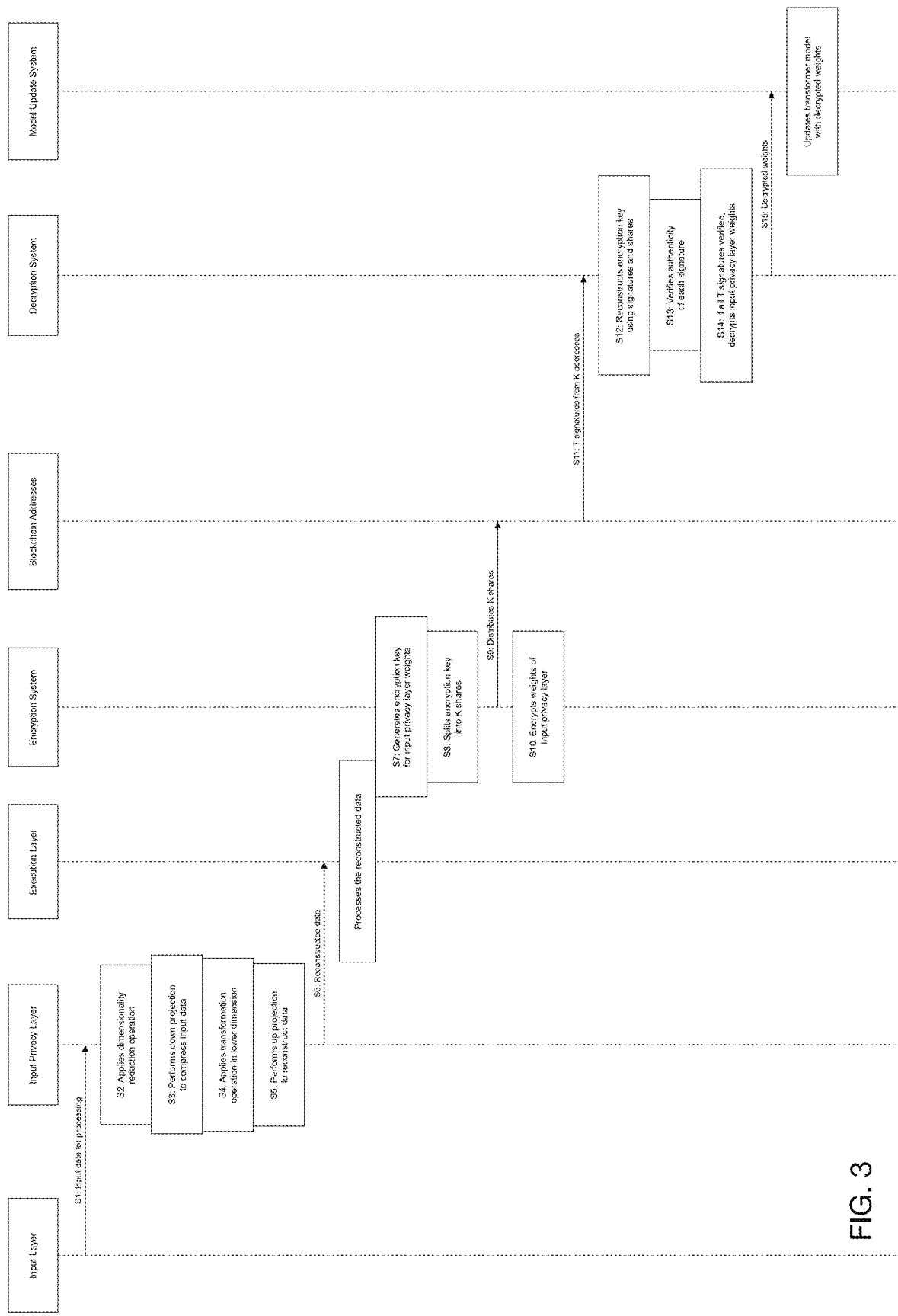
FIG. 3 shows a detailed sequence diagram illustrating interactions between key components of the system, according to an embodiment.

The input privacy layer 120 may comprise several components that work together to apply a dimensionality reduction operation to the input data. As shown in FIG. 3, this process may involve a series of steps (S2-S5) that transform the input data while preserving privacy.

A down projection module 121 may perform a down projection operation to compress the input data from a higher dimension of size N to a lower dimension of size M, where M<N (step S3). This compression may help reduce the dimensionality of the data, potentially obscuring sensitive information.

Following the down projection, a transformation operation may be applied in the lower dimension (step S4). This transformation may further modify the compressed data, potentially enhancing its privacy-preserving properties.

An up projection module 124 may then perform an up projection operation to reconstruct the data back to the higher dimension of size N (step S5). This reconstruction may allow the input privacy layer 120 to maintain the same input and output dimensionality as the input layer, ensuring compatibility with subsequent layers of the transformer model.

The input privacy layer 120 may apply these privacy-preserving transformations uniformly across all input features. This uniform application may help ensure consistent privacy protection across the entire input space.

In some cases, the input privacy layer 120 may process batches of input data in parallel. This parallel processing may improve computational efficiency, allowing for faster throughput of large datasets.

By positioning the input privacy layer 120 horizontally between the input layer and the execution system 130, the system may effectively separate privacy-preserving computations from the main execution logic of the transformer model. This separation may allow for more modular design and easier management of privacy-related operations.

The noise addition module 123 may be a crucial component of the input privacy layer 120. This module may apply a noise addition operation to the compressed data in the lower dimension. The noise addition operation may generate Gaussian noise scaled based on a current privacy budget. The scaled noise may then be added to the compressed data, introducing controlled randomness that can enhance privacy protection.

In some cases, the noise addition module 123 may dynamically adjust the noise scale as the privacy budget is consumed during model training or inference. This dynamic adjustment may help balance privacy protection with model utility over time.

The input privacy layer 120 may adaptively adjust the size M of the lower dimension based on several factors. These factors may include the current privacy budget, a target accuracy threshold for the transformer model, and computational resource constraints. For example, the size M may be decreased to enhance privacy when the privacy budget is low or the accuracy is above the target threshold. Conversely, M may be increased to preserve more information when the privacy budget is high or the accuracy falls below the target threshold.

This adaptive adjustment may allow the input privacy layer 120 to dynamically balance privacy protection with model performance, potentially optimizing the trade-off between these often competing objectives.

The execution system 130, as illustrated in FIG. 2, may be responsible for processing the reconstructed data from the input privacy layer 120. This system may form a critical component of the privacy-preserving transformer model system 100, serving as the primary computational engine for the model's operations.

In some cases, the execution system 130 may comprise multiple layers of neural network architecture, including attention mechanisms, feed-forward networks, and normalization layers typical of transformer models. The execution system 130 may be designed to handle the specific tasks for which the transformer model is trained, such as natural language processing, image recognition, or other complex data analysis tasks.

FIG. 3 provides a detailed sequence diagram that illustrates the interaction between various components of the privacy-preserving transformer model system 100, including the execution system 130. As shown in FIG. 3, a step S6 may involve sending the reconstructed data from the input privacy layer to the execution system 130 for processing.

The execution system 130 may receive the reconstructed data, which has undergone dimensionality reduction, transformation, and reconstruction in the input privacy layer 120. This reconstructed data may maintain the same dimensionality as the original input but with enhanced privacy properties due to the operations performed in the input privacy layer 120.

In some cases, the execution system 130 may apply various computational operations to the reconstructed data. These operations may include, but are not limited to:
1. Self-attention mechanisms: The execution system 130 may employ multi-head attention layers to capture complex relationships within the input data.
2. Feed-forward neural networks: These may be used to further process the outputs of the attention mechanisms, allowing for non-linear transformations of the data.
3. Layer normalization: The execution system 130 may apply normalization techniques to stabilize the learning process and improve the model's performance.
4. Residual connections: These may be used to facilitate the flow of information across different layers of the execution system 130.

The execution system 130 may process the reconstructed data in a manner that preserves the privacy guarantees provided by the input privacy layer 120. This may involve careful management of intermediate computations and outputs to prevent inadvertent leakage of sensitive information.

In some cases, the execution system 130 may be designed to operate efficiently on hardware accelerators such as GPUs or TPUs, allowing for rapid processing of large volumes of data. The system may also incorporate techniques for distributed or parallel processing to further enhance computational efficiency.

The output of the execution system 130 may serve as the final result of the transformer model's computations, which may then be used for various downstream tasks or applications. In some implementations, this output may undergo further post-processing or interpretation steps before being presented as the model's final prediction or analysis.

The execution system 130 may work in conjunction with other components of the privacy-preserving transformer model system 100, such as the privacy monitoring system 170. The metrics tracking module 171 may monitor the performance and behavior of the execution system 130 to ensure that privacy guarantees are maintained throughout the computation process.

In some cases, the hyperparameter adjustment module 172 may fine-tune parameters of the execution system 130 based on privacy metrics and model performance data. This adaptive approach may help maintain an optimal balance between computational efficiency, model accuracy, and privacy preservation.

The execution system 130 may also interact with the model update system 160, which may incorporate updated weights into the transformer model after the decryption process. This interaction may ensure that the execution system 130 always operates with the most current and privacy-preserving model parameters.

By processing the reconstructed data through the execution system 130, the privacy-preserving transformer model system 100 may achieve its intended computational objectives while maintaining strong privacy guarantees for the input data. This approach may allow for the development of powerful and privacy-aware AI systems suitable for a wide range of applications in sensitive domains.

The encryption system 140, as illustrated in FIG. 2, may be responsible for securing the weights of the input privacy layer 120. The encryption system 140 may comprise several key components that work together to generate, split, and manage encryption keys, as well as encrypt the layer weights.

A key generation module 141 within the encryption system 140 may be responsible for generating an encryption key for encrypting weights of the input privacy layer 120. In some cases, the key generation process may involve generating a random seed using a cryptographically secure random number generator. The encryption key may then be derived from this random seed using a key derivation function. To enhance security, metadata about the key generation process may be stored in a secure enclave.

Once the encryption key has been generated, a key splitting module 142 may split the encryption key into K shares using a secret sharing scheme, where K may be an integer greater than 1. In some cases, the secret sharing scheme employed may be Shamir's Secret Sharing scheme. This process may involve selecting a polynomial of degree T−1, where T may be a predefined threshold. The constant term of this polynomial may be set to be the encryption key. The key splitting module 142 may then generate K points on the polynomial to create the K shares. Each share may be associated with a unique identifier to facilitate management and reconstruction.

As illustrated in FIG. 3, the process of generating and splitting the encryption key may be represented by a step S7 and a step S8, respectively. These steps may be crucial in preparing the encryption key for secure distribution and storage.

The encryption system 140 may then distribute the K shares among K distinct blockchain addresses. This distribution process, represented by a step S9 in FIG. 3, may involve several security measures. In some cases, each share may be encrypted using the public key of its corresponding blockchain address before transmission. The encrypted shares may be transmitted through a secure communication channel to ensure their confidentiality during transit.

To maintain a record of the distribution, a mapping between share identifiers and blockchain addresses may be stored in a distributed ledger. This mapping may facilitate the retrieval of shares when needed for key reconstruction. In some cases, the encryption system 140 may implement a time-lock mechanism that prevents share retrieval before a specified time, adding an additional layer of security to the key management process.

Following the key generation and distribution, a weight encryption module 144 may be responsible for encrypting the weights of the input privacy layer 120 using the encryption key. This encryption process, represented by a step S10 in FIG. 3, may ensure that the sensitive weight information remains protected even if unauthorized access to the model occurs.

The encryption system 140 may work in conjunction with other components of the privacy-preserving transformer model system 100. For instance, the encryption system 140 may interact with the decryption system 150 during key reconstruction and weight decryption processes. The encryption system 140 may also coordinate with the key management system 180 for tasks such as key rotation and secure destruction of outdated keys.

By implementing these sophisticated encryption mechanisms, the encryption system 140 may provide a robust layer of security for the privacy-preserving transformer model, protecting sensitive information and ensuring the integrity of the model's operations.

The decryption system 150, as illustrated in FIG. 2, may be responsible for securely reconstructing the encryption key and decrypting the weights of the input privacy layer. FIG. 3 provides a detailed sequence diagram that illustrates the interaction between various components of the privacy-preserving transformer model system 100, including the decryption system 150.

The decryption process may begin with a step S11, where the signature collection module 151 receives a set of T signatures corresponding to T distinct blockchain addresses from the K addresses. In this context, T may be an integer less than or equal to K and greater than or equal to a predefined threshold. This threshold mechanism may ensure that a sufficient number of authorized parties have approved the decryption process.

Following the collection of signatures, a step S12 may involve reconstructing the encryption key using the received T signatures and their corresponding shares through polynomial interpolation. This reconstruction process may utilize advanced cryptographic techniques to securely reassemble the original encryption key from the distributed shares.

In a step S13, the signature verification module 153 may verify the authenticity of each signature using the corresponding blockchain address's public key. This verification step may be crucial for ensuring the integrity and legitimacy of the decryption request.

The weight decryption module 154 may then proceed with a step S14, where the weights of the input privacy layer are decrypted using the reconstructed encryption key. Importantly, this decryption may only occur if all T signatures are successfully verified, providing an additional layer of security and access control.

In some cases, the decryption system 150 may implement additional security measures. For instance, the system may verify that the number of received signatures meets or exceeds the predefined threshold T before initiating the decryption process. This check may help prevent unauthorized access attempts that do not meet the minimum required approvals.

The decryption system 150 may also validate each signature using the public key of the corresponding blockchain address. This validation process may involve cryptographic operations to ensure that each signature is genuine and corresponds to an authorized blockchain address.

In some implementations, the decryption system 150 may retrieve the encrypted shares associated with the verified signatures. These encrypted shares may have been previously distributed and stored securely, possibly using the encryption system 140.

The decryption of shares may involve using the private keys of the participating blockchain addresses. This step may require careful key management and secure communication channels to protect the privacy of the decryption process.

Once the shares are decrypted, the decryption system 150 may apply Lagrange interpolation to the decrypted shares to reconstruct the original encryption key. This mathematical technique may allow for the accurate reconstruction of the encryption key from a subset of the original shares, provided that the threshold number of shares is available.

The decryption system 150 may work in conjunction with other components of the privacy-preserving transformer model system 100. For example, the privacy monitoring system 170 may track the decryption process to ensure compliance with privacy policies and regulations. The metrics tracking module 171 may record data about the frequency and nature of decryption requests, which could be used to inform future security policies.

In some cases, the hyperparameter adjustment module 172 may use information from the decryption process to fine-tune the system's security parameters. For instance, if decryption requests are occurring more frequently than expected, the module may recommend adjusting the threshold T or implementing additional verification steps.

The decryption system 150 may also interact with the key management system 180. The key rotation module 181 may periodically initiate the generation of new encryption keys, requiring the decryption system 150 to adapt to these changes. The transition management module 182 may ensure a smooth transition between old and new keys during the decryption process.

By implementing these decryption procedures, the privacy-preserving transformer model system 100 may maintain a high level of security while allowing authorized access to the encrypted weights of the input privacy layer. This approach may enable the system to balance the need for data protection with the requirement for model updates and maintenance.

The model update system 160, as illustrated in FIG. 2, may be responsible for incorporating the decrypted weights into the transformer model. This system may play a crucial role in maintaining the privacy-preserving properties of the model while ensuring its continued effectiveness and accuracy.

In some cases, the model update system 160 may receive the decrypted weights from the weight decryption module 154 of the decryption system 150. As shown in FIG. 3, this process may be represented by a step S15, where the decrypted weights are sent to the model update system 160.

The model update system 160 may update the transformer model by replacing the original weights of the input privacy layer with the decrypted weights. This replacement process may involve several steps to ensure the integrity and consistency of the model:

1. Verification: The model update system 160 may first verify the format and dimensions of the decrypted weights to ensure they are compatible with the existing model architecture.
2. Backup: In some cases, the model update system 160 may create a backup of the current model weights before proceeding with the update. This backup may serve as a safeguard in case any issues arise during the update process.
3. Weight Replacement: The model update system 160 may then systematically replace the original weights of the input privacy layer with the decrypted weights. This process may involve updating the relevant parameters in the model's internal data structures or memory representations.
4. Consistency Check: After replacing the weights, the model update system 160 may perform consistency checks to ensure that the update has been applied correctly and that the model remains in a valid state.
5. Cache Invalidation: In some cases, the model update system 160 may need to invalidate any caches or optimized representations of the model that depend on the old weights, ensuring that subsequent computations use the updated weights.

The model update system 160 may work in conjunction with other components of the privacy-preserving transformer model system 100. For instance, the model update system 160 may coordinate with the privacy monitoring system 170 to ensure that the updated model maintains the desired privacy guarantees. The metrics tracking module 171 may monitor the performance of the updated model, while the hyperparameter adjustment module 172 may fine-tune parameters based on the new weights if necessary.

In some cases, the model update system 160 may also interact with the key management system 180. For example, after a successful weight update, the model update system 160 may signal the key rotation module 181 to initiate a new key rotation cycle, further enhancing the security of the model.

The model update system 160 may be designed to handle various scenarios that could arise during the update process. For instance:

1. Partial Updates: In some cases, only a subset of the input privacy layer weights may need to be updated. The model update system 160 may be capable of applying these partial updates efficiently, without disturbing the unaffected parts of the model.
2. Error Handling: The model update system 160 may incorporate robust error handling mechanisms to deal with potential issues during the update process, such as incomplete or corrupted decrypted weights.
3. Rollback Capability: In the event of a failed update, the model update system 160 may be able to roll back to the previous state of the model, ensuring operational continuity.
4. Update Logging: The model update system 160 may maintain detailed logs of weight updates, including timestamps, version information, and cryptographic hashes of the updated weights. These logs may be useful for auditing purposes and ensuring the traceability of model changes.

By efficiently updating the transformer model with decrypted weights, the model update system 160 may enable the privacy-preserving transformer model system 100 to maintain an optimal balance between privacy protection and model performance. This dynamic update capability may allow the system to adapt to changing privacy requirements or incorporate improvements in the privacy-preserving techniques over time.

The privacy monitoring system 170, as illustrated in FIG. 2, may be a crucial component of the privacy-preserving transformer model system 100. The privacy monitoring system 170 may be responsible for tracking, analyzing, and managing various privacy-related metrics and parameters throughout the operation of the transformer model.

The privacy monitoring system 170 may comprise several components, including a metrics tracking module 171, a hyperparameter adjustment module 172, and a privacy budget module 173. These components may work in concert to ensure that the privacy guarantees of the system are maintained while optimizing model performance.

The metrics tracking module 171 may be responsible for monitoring privacy metrics for the input privacy layer during both training and inference phases. In some cases, the metrics tracking module 171 may track various privacy-related indicators, such as:

1. Compression ratio between the original input dimension N and the reduced dimension M in the input privacy layer.
2. Reconstruction error between the original input data and the reconstructed data after passing through the input privacy layer.
3. Privacy budget consumption rate, which may indicate how quickly the allocated privacy budget is being used.
4. Noise magnitude added in the lower dimension by the noise addition module 123.

The metrics tracking module 171 may collect and store these privacy metrics along with corresponding model performance data. This data collection may provide valuable insights into the relationship between privacy preservation and model utility. In some cases, the stored data may be used to inform future configurations of the input privacy layer and other components of the privacy-preserving transformer model system 100.

The hyperparameter adjustment module 172 may be responsible for fine-tuning various parameters of the input privacy layer based on the monitored privacy metrics. This adaptive approach may help maintain a desired privacy-utility trade-off as the model operates over time. In some cases, the hyperparameter adjustment module 172 may modify parameters such as:

1. The size M of the lower dimension in the input privacy layer.
2. The noise scale used by the noise addition module 123.
3. The privacy budget allocation rate.
4. The transformation parameters used in the input privacy layer.

The hyperparameter adjustment module 172 may employ various optimization algorithms to determine the most appropriate adjustments based on the current privacy metrics and model performance data. In some cases, the hyperparameter adjustment module 172 may use techniques such as Bayesian optimization or gradient-based methods to efficiently explore the hyperparameter space.

The privacy budget module 173 may be responsible for managing and tracking the overall privacy budget of the system. The privacy budget may represent the total amount of privacy "expenditure" allowed for the model's operations before the privacy guarantees may be compromised. In some cases, the privacy budget module 173 may:

1. Initialize the privacy budget based on predefined privacy requirements.
2. Track the consumption of the privacy budget during model training and inference.
3. Enforce privacy budget constraints by limiting certain operations when the budget is close to depletion.
4. Provide alerts or trigger system responses when the privacy budget reaches critical levels.

The privacy budget module 173 may work closely with other components of the privacy monitoring system 170 to ensure that privacy guarantees are maintained throughout the model's lifecycle. In some cases, the privacy budget module 173 may interact with the encryption system 140 and the decryption system 150 to adjust encryption and decryption processes based on the current privacy budget status.

The privacy monitoring system 170 may also interact with other components of the privacy-preserving transformer model system 100. For example, the metrics tracking module 171 may receive data from the input privacy layer and the execution system 130 to compute relevant privacy metrics. The hyperparameter adjustment module 172 may send updated parameters to the input privacy layer to implement adaptive privacy-preserving strategies.

In some cases, the privacy monitoring system 170 may provide feedback to the model update system 160, influencing how the transformer model is updated based on privacy considerations. This interaction may ensure that model updates do not inadvertently compromise the privacy guarantees of the system.

The privacy monitoring system 170 may also interface with the key management system 180, potentially influencing key rotation schedules or encryption strategies based on the current privacy status of the system. For instance, if the privacy metrics indicate a potential vulnerability, the privacy monitoring system 170 may signal the key rotation module 181 to initiate a key rotation process.

By continuously monitoring, analyzing, and adjusting privacy-related aspects of the transformer model, the privacy monitoring system 170 may play a vital role in maintaining the delicate balance between data utility and privacy protection. The system's adaptive nature may allow it to respond to changing conditions and ensure robust privacy guarantees throughout the model's operational lifecycle.

The key management system 180, as illustrated in FIG. 2, may be responsible for overseeing the lifecycle of encryption keys used in the privacy-preserving transformer model system 100. The key management system 180 may comprise several components that work together to ensure the security and integrity of the encryption keys throughout their lifecycle.

The key rotation module 181 may be a crucial component of the key management system 180. In some cases, the key rotation module 181 may implement a key rotation protocol for the encryption key. This protocol may involve generating a new encryption key and splitting it into shares at predefined intervals. The generation of a new encryption key may be similar to the process performed by the key generation module 141, potentially involving the use of a cryptographically secure random number generator and a key derivation function.

Once the new encryption key has been generated and split into shares, the key rotation module 181 may initiate the distribution of these new shares to the blockchain addresses. This distribution process may be similar to the initial distribution performed by the encryption system 140, potentially involving encryption of each share using the public key of its corresponding blockchain address and transmission through secure communication channels.

The transition management module 182 may be responsible for managing the transition between old and new encryption keys. In some cases, the transition management module 182 may establish a transition period where both the old and new encryption keys are valid. This transition period may allow for a smooth changeover between keys without disrupting the ongoing operations of the privacy-preserving transformer model system 100.

During the transition period, the key management system 180 may coordinate with other components of the system to ensure proper handling of both old and new keys. For instance, the decryption system 150 may need to be capable of working with both sets of keys during this period.

An important aspect of the key rotation process may be the re-encryption of the weights of the input privacy layer 120 using the new encryption key. This re-encryption process may be coordinated by the key management system 180 in conjunction with the weight encryption module 144. The re-encryption may ensure that the weights remain protected under the new encryption key, maintaining the security of the privacy-preserving transformer model.

After the transition period and successful re-encryption of the weights, the secure destruction module 183 may be responsible for securely destroying the old encryption key and its shares. This secure destruction process may involve multiple steps to ensure that the old key material cannot be recovered or reconstructed. In some cases, the secure destruction module 183 may employ techniques such as overwriting the key data multiple times with random patterns, using specialized secure deletion algorithms, or even physical destruction of storage media if applicable.

The key management system 180 may work in close coordination with other components of the privacy-preserving transformer model system 100. For instance, the key management system 180 may interact with the privacy monitoring system 170 to ensure that key rotation and management processes align with overall privacy goals and metrics. The metrics tracking module 171 may monitor and record data about key rotation events, while the hyperparameter adjustment module 172 may use this information to fine-tune the frequency or parameters of the key rotation process.

In some cases, the key management system 180 may also interface with the model update system 160. For example, after a successful key rotation and re-encryption of weights, the key management system 180 may signal the model update system 160 to incorporate the newly encrypted weights into the transformer model.

By implementing these comprehensive key management processes, including key rotation, transition management, and secure destruction, the key management system 180 may enhance the overall security and privacy preservation capabilities of the transformer model system 100. This sophisticated key management approach may help protect against potential vulnerabilities associated with long-term use of a single encryption key, while ensuring continuous operation and protection of sensitive model components.

Figure 4:
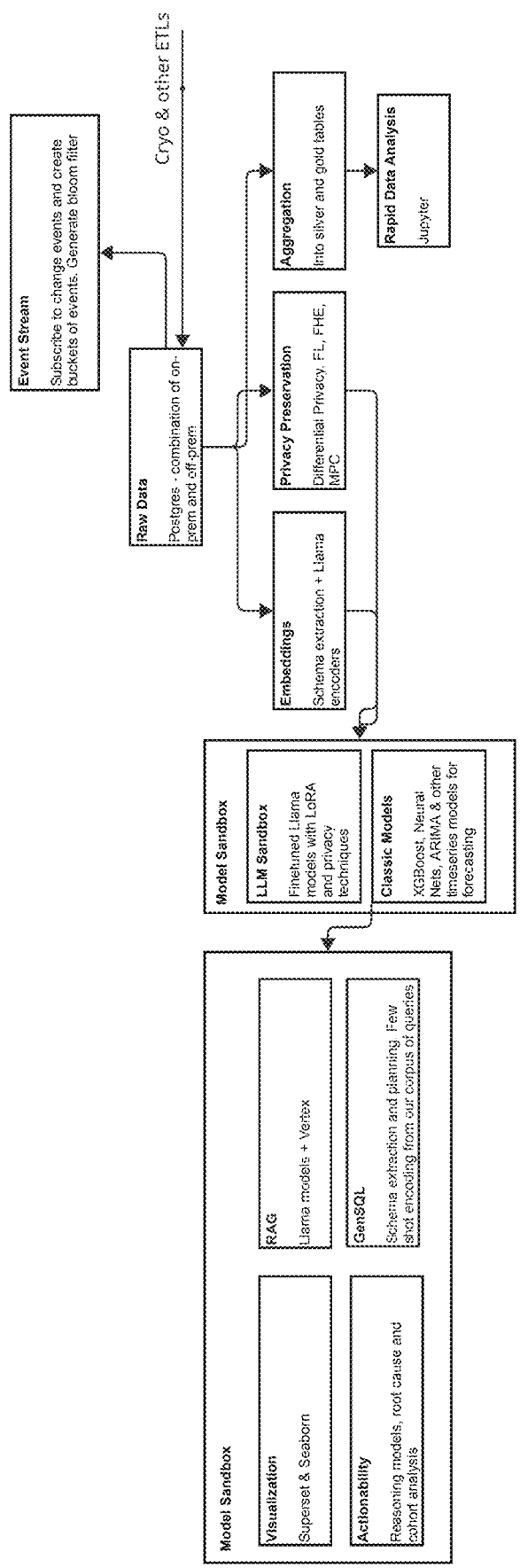
FIG. 4 illustrates a system diagram of a data processing and analysis architecture, according to aspects of the present disclosure.

The data processing and analysis architecture, as illustrated in FIG. 4, may provide a comprehensive framework for handling, processing, and analyzing data while maintaining privacy and security. This architecture may incorporate multiple interconnected modules arranged in a hierarchical structure, enabling efficient data flow and processing across various stages.

At the foundation of the architecture, raw data may be ingested from various sources, including on-premises and off-premises data stores. In some cases, this raw data may be stored in a PostgreSQL database, which may serve as a centralized repository for diverse data types. The architecture may employ tools such as Cryo and other Extract, Transform, Load (ETL) processes to facilitate the initial data ingestion and preparation.

From the raw data layer, the architecture may branch into three parallel processing modules, each serving a distinct purpose in the data pipeline. The first module may focus on embeddings, utilizing advanced natural language processing techniques. In some cases, this module may employ Llama encoders for schema extraction, enabling the system to understand and represent the structure of the incoming data effectively.

The second parallel module may be dedicated to privacy preservation, incorporating various techniques to ensure data confidentiality and security. This module may implement methods such as Differential Privacy, Federated Learning (FL), Fully Homomorphic Encryption (FHE), and Multi-Party Computation (MPC). By employing these privacy-preserving techniques, the architecture may enable secure data processing and analysis while minimizing the risk of exposing sensitive information.

The third parallel module may focus on data aggregation, processing the incoming data into more refined and structured formats. This module may produce silver and gold tables, representing different levels of data refinement and aggregation. These processed datasets may serve as the foundation for subsequent analysis and modeling tasks.

The architecture may incorporate a Rapid Data Analysis module, which may utilize Jupyter notebooks or similar interactive computing environments. This module may enable data scientists and analysts to perform exploratory data analysis, create visualizations, and develop preliminary models based on the processed data.

In addition to the main data processing pipeline, the architecture may include an Event Stream module. This component may subscribe to change events within the system, creating buckets of events and generating bloom filters. These bloom filters may serve as efficient data structures for probabilistic set membership queries, potentially enhancing the system's ability to quickly determine the presence of specific data elements or patterns.

The architecture may feature two distinct Model Sandbox environments, each serving different analytical purposes. The first Model Sandbox may contain several specialized modules:
1. A Visualization module that may utilize tools such as Superset and Seaborn to create interactive and informative data visualizations.
2. A Retrieval-Augmented Generation (RAG) module that may implement Llama models in conjunction with Vertex AI, enabling advanced natural language processing and generation capabilities.
3. An Actionability module that may incorporate reasoning models and cohort analysis, potentially facilitating decision-making processes based on the analyzed data.
4. A GenSQL module that may focus on schema extraction and query planning, potentially automating or optimizing database interactions.

The second Model Sandbox environment may be dedicated to more traditional machine learning approaches and may include:
1. A Large Language Model (LLM) Sandbox for fine-tuned models, potentially incorporating techniques such as Low-Rank Adaptation (LoRA) and various privacy-preserving methods.
2. A Classic Models component that may implement algorithms such as XGBoost, Neural Networks, ARIMA, and other time series models for forecasting and predictive analytics.

This comprehensive data processing and analysis architecture may enable a wide range of analytical capabilities while maintaining a strong focus on data privacy and security. By incorporating various privacy-preserving techniques and providing multiple environments for model development and deployment, the architecture may support diverse use cases across different domains and industries.

The modular nature of this architecture may allow for flexibility and scalability, potentially enabling organizations to adapt the system to their specific needs and data processing requirements. The integration of privacy-preserving techniques throughout the pipeline may make this architecture particularly suitable for handling sensitive or regulated data, while still allowing for sophisticated analysis and modeling.

Figure 5:
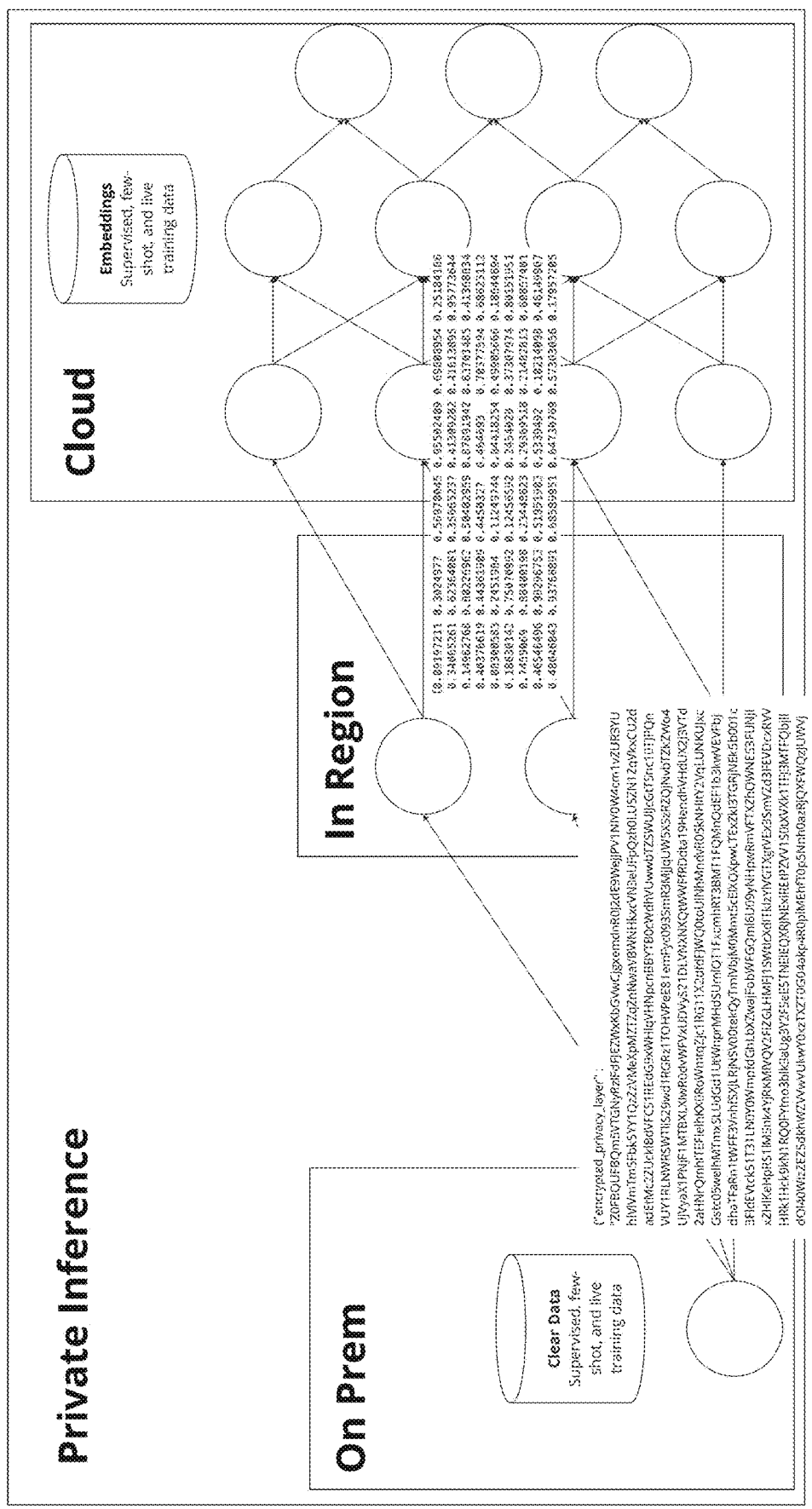
FIG. 5 illustrates a block diagram of a private inference system, in accordance with example embodiments.

The private inference system, as illustrated in FIG. 5, may provide a comprehensive architecture for secure and privacy-preserving data processing across multiple environments. FIG. 5 depicts a block diagram showcasing three distinct environments: On Prem, In Region, and Cloud, each playing a crucial role in maintaining data privacy while enabling efficient inference operations.

In the On Prem environment, a database may store clear data, including supervised, few-shot, and live training data. This environment may represent the most secure and controlled setting, where sensitive information may be kept in its original, unencrypted form. The On Prem database may serve as the primary source of raw data for the inference system.

The In Region environment may act as an intermediary layer between the highly secure On Prem environment and the more distributed Cloud environment. In some cases, the In Region environment may contain a neural network architecture represented by interconnected nodes. Between these nodes, a matrix of numerical values and encrypted data may be observed. This configuration may allow for initial processing and transformation of data while maintaining a level of privacy and security that may be higher than what is typically achievable in a cloud setting.

The Cloud environment, as depicted in FIG. 5, may comprise a database storing embeddings data, which may include supervised, few-shot, and live training data in a processed form. Additionally, the Cloud environment may feature a neural network architecture with multiple interconnected nodes arranged in layers. This cloud-based neural network may be responsible for performing the main inference tasks on the processed and privacy-preserved data.

The private inference system may facilitate data flow between these three environments in a manner that preserves privacy and security. In some cases, data may move from the On Prem environment through the In Region processing before connecting to the Cloud infrastructure. This multi-stage approach may allow for progressive data transformation and privacy enhancement at each step.

The On Prem database may serve as the initial data repository, storing sensitive information in its clear, unencrypted form. This data may include labeled examples for supervised learning, a small set of examples for few-shot learning, and continuously updated data for live training. By keeping this data on-premises, organizations may maintain full control over their most sensitive information.

In the In Region environment, the neural network architecture may perform initial data processing and transformation. The matrix of numerical values between the nodes may represent the weights and biases of the neural network, while the encrypted data may indicate that some level of privacy-preserving techniques, such as homomorphic encryption or secure multi-party computation, may be applied at this stage. This In Region processing may serve to reduce the sensitivity of the data before it is transmitted to the Cloud environment.

The Cloud environment may receive data that has already undergone initial privacy-preserving transformations. The database in the Cloud may store embeddings, which may be high-dimensional vector representations of the original data. These embeddings may preserve useful features of the data while obscuring the raw, sensitive information. The neural network in the Cloud environment may then perform inference tasks on these embeddings, potentially allowing for complex analyses without direct access to the original sensitive data.

The directional lines connecting the nodes in both neural networks may indicate the flow of data and computations through the system. This flow may be designed to ensure that sensitive information is progressively transformed and protected as it moves from the On Prem environment to the Cloud.

In some cases, the private inference system may employ additional privacy-preserving techniques throughout its architecture. These may include:
1. Differential Privacy: Adding controlled noise to the data or model outputs to prevent the extraction of individual data points.
2. Federated Learning: Allowing the model to be trained across multiple decentralized edge devices or servers holding local data samples, without exchanging them.
3. Secure Enclaves: Utilizing hardware-based isolated execution environments to protect sensitive computations and data.
4. Encrypted Computation: Performing computations on encrypted data, allowing for data processing without exposing the underlying information.

The private inference system may be designed to balance the need for data utility with stringent privacy requirements. By distributing different aspects of data storage and processing across the On Prem, In Region, and Cloud environments, the system may provide a flexible and secure framework for organizations dealing with sensitive data.

In some cases, the system may allow for dynamic adjustment of privacy levels based on the specific requirements of different data types or inference tasks. For example, highly sensitive data may be processed entirely within the On Prem and In Region environments, while less sensitive data may leverage the scalability and computational power of the Cloud environment.

The private inference system may also incorporate mechanisms for auditing and monitoring data flow and access patterns. These mechanisms may help ensure compliance with data protection regulations and allow organizations to maintain visibility into how their sensitive information is being used and protected throughout the inference process.

By leveraging this multi-environment architecture, the private inference system may enable organizations to harness the power of advanced machine learning and inference techniques while maintaining robust privacy safeguards. This approach may be particularly valuable in domains such as healthcare, finance, and government, where the need to protect sensitive information may be paramount.

Figure 6:
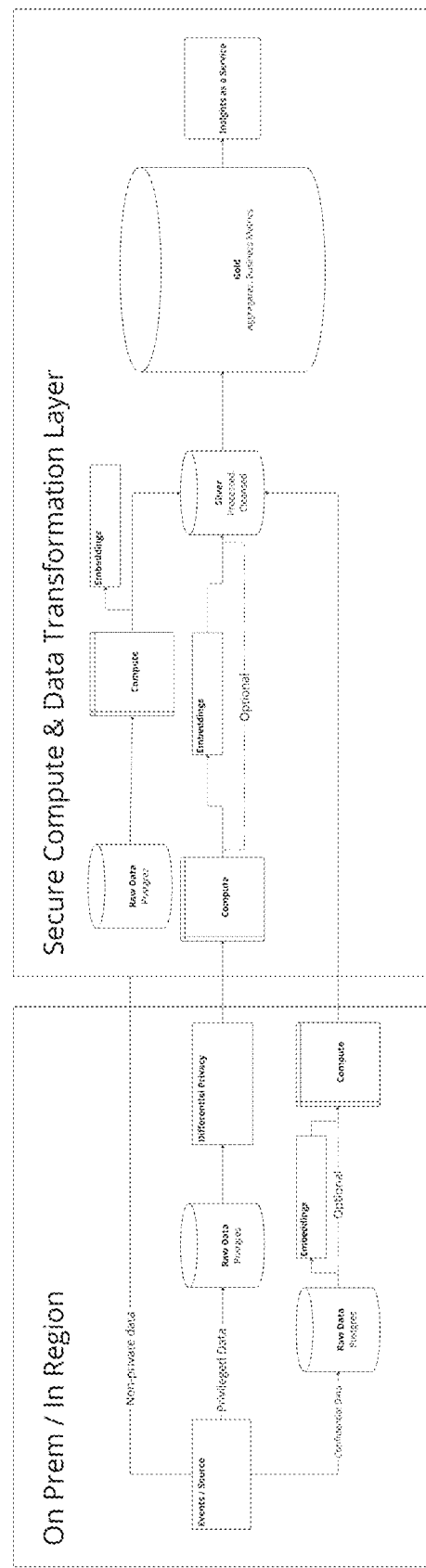
FIG. 6 illustrates a system architecture diagram showing a data processing system, according to an aspect of the present disclosure.

The data processing system architecture, as illustrated in FIG. 6, may provide a comprehensive framework for handling and transforming data while maintaining privacy, security, and compliance with sovereign data requirements. The architecture may be divided into two main sections: an On Prem/In Region section and a Secure Compute & Data Transformation Layer section.

In some cases, the operations of the data processing system may be distributed across three distinct regions to comply with sovereign data requirements: on-premises, sovereign-compliant regional, and separate cloud environments. This distribution may allow for flexible data handling while adhering to specific regulatory and privacy constraints.

The On Prem/In Region section may contain components for handling both non-private and confidential data flows. An Events/Source component may connect to Raw Data storage units through two distinct paths. The first path may handle privileged data and may include a Differential Privacy component, which may apply privacy-preserving techniques to sensitive information before further processing. The second path may process confidential data and may include an optional embeddings component connected to a compute unit, potentially allowing for secure representation of complex data structures.

The Secure Compute & Data Transformation Layer section may contain multiple processing components designed to handle data securely and efficiently. Raw Data storage units may connect to compute nodes that process the data. These compute nodes may optionally generate embeddings, which may provide a privacy-preserving representation of the original data.

The processed data may flow into a Silver processing/cleansed stage, which may involve data cleaning, normalization, and initial transformations. This stage may serve as an intermediate step between raw data and fully processed information. The output from the Silver stage may then feed into a Gold aggregates/business metrics storage unit, which may contain high-level, aggregated data suitable for analysis and decision-making.

In some cases, the final output of the data processing system may be provided as Insights as a Service, potentially offering valuable business intelligence while maintaining data privacy and sovereignty.

The system architecture may include multiple data transformation stages, with optional processing paths indicated by dashed lines. Data may flow from left to right through the system, undergoing progressive refinement and processing at each stage. This staged approach may allow for granular control over data transformations and privacy-preserving operations.

The architecture may separate the handling of different data types and may provide multiple processing options based on data sensitivity and requirements. This separation may be crucial for complying with various data protection regulations and maintaining the confidentiality of sensitive information.

In the on-premises environment, the system may store and process raw input data, potentially including sensitive or regulated information that must remain within the organization's physical boundaries. This environment may also be responsible for generating initial embeddings from the raw input data, which may serve as a privacy-preserving representation of the original information.

The sovereign-compliant regional environment may receive privacy-preserved embeddings from the on-premises environment. In this region, the system may apply the dimensionality reduction operation using the input privacy layer, potentially further enhancing the privacy guarantees of the processed data. This environment may also be responsible for processing the reconstructed data through at least a portion of the execution layer, ensuring that sensitive computations occur within a controlled, compliant setting.

The separate cloud environment, which may not be controlled by the sovereign entity, may be utilized for completing any remaining execution layer processing. This environment may also be responsible for distributing key shares among blockchain addresses, collecting signatures, reconstructing encryption keys, and updating the transformer model with decrypted weights. By performing these operations in a separate cloud environment, the system may leverage the scalability and computational resources of cloud infrastructure while maintaining compliance with data sovereignty requirements.

This distributed approach to data processing and transformation may enable organizations to balance the need for advanced analytics and machine learning capabilities with strict data protection and sovereignty requirements. By carefully segregating operations across different environments, the system may maintain control over sensitive data while still benefiting from the power of cloud-based processing and storage.

The modular nature of this architecture may allow for flexibility and scalability, potentially enabling organizations to adapt the system to their specific needs and data processing requirements. The integration of privacy-preserving techniques throughout the pipeline may make this architecture particularly suitable for handling sensitive or regulated data, while still allowing for sophisticated analysis and modeling.

Figure 7:
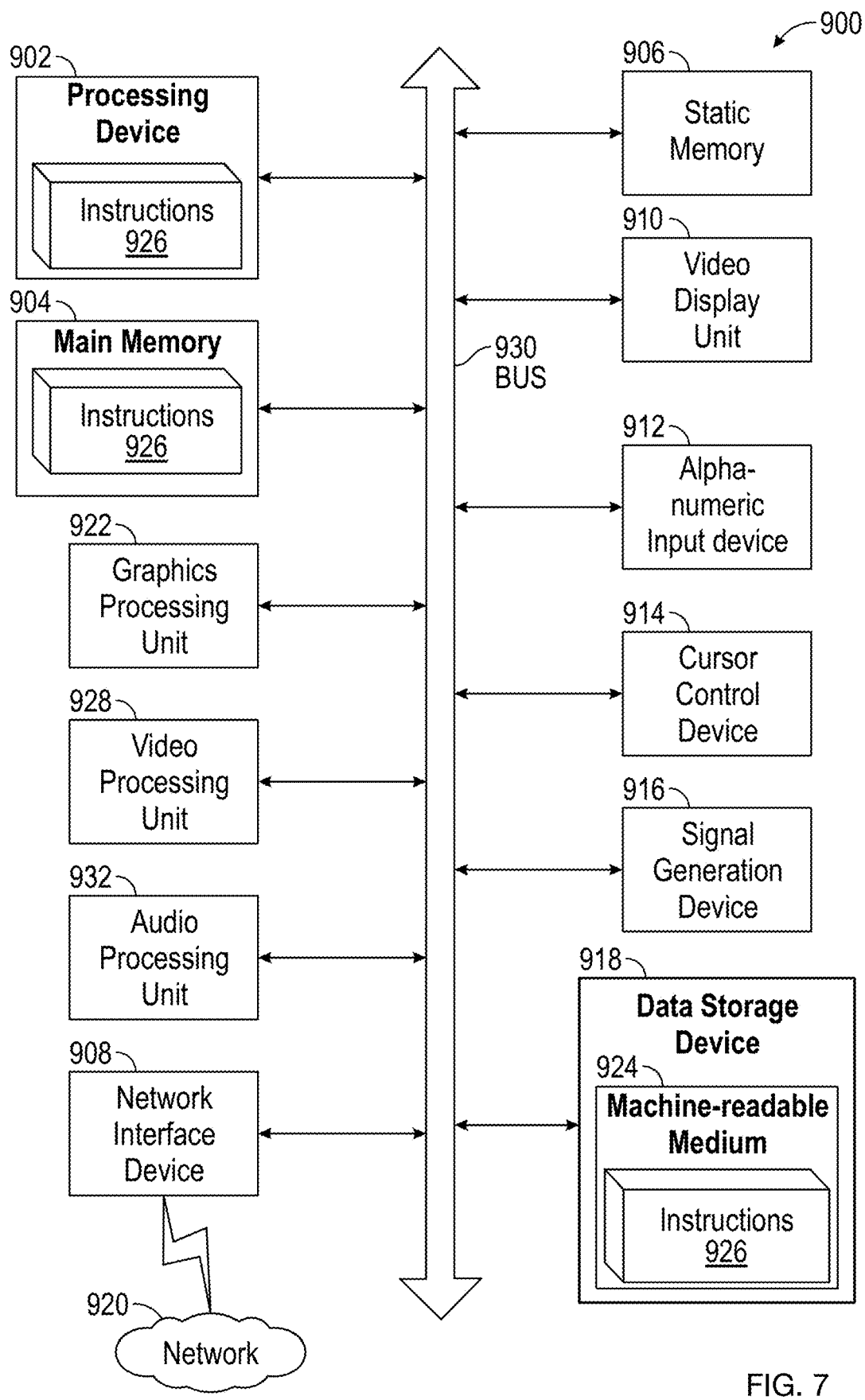
FIG. 7 illustrates a block diagram of a computing system, according to an embodiment.

FIG. 7 illustrates a block diagram of a computing system 900. The computing system 900 may provide the hardware and software infrastructure to support the operations of the privacy-preserving transformer model system described earlier.

The computing system 900 may include a processing device 902, which may be responsible for executing instructions and performing computations necessary for the operation of the privacy-preserving transformer model. In some cases, the processing device 902 may be a central processing unit (CPU) capable of handling general-purpose computations as well as specialized tasks related to machine learning and data processing.

Connected to the processing device 902 via a bus 930 may be a main memory 904. The main memory 904 may store instructions 926 and data required for the immediate execution of tasks by the processing device 902. In some cases, the main memory 904 may be volatile memory, such as Random Access Memory (RAM), allowing for quick access to frequently used data and instructions.

The computing system 900 may also include a static memory 906, which may be used for storing data and instructions that do not require frequent modification. In some cases, the static memory 906 may be non-volatile memory, such as Read-Only Memory (ROM) or flash memory, retaining its contents even when power is removed from the system.

For enhanced graphical processing capabilities, the computing system 900 may incorporate a graphics processing unit 922. The graphics processing unit 922 may be specialized for rendering images, animations, and other visual elements. In some cases, the graphics processing unit 922 may also be utilized for parallel processing tasks related to machine learning and data analysis, potentially accelerating certain operations of the privacy-preserving transformer model.

To handle video-specific tasks, the computing system 900 may include a video processing unit 928. The video processing unit 928 may be responsible for encoding, decoding, and manipulating video data, which may be relevant for applications of the privacy-preserving transformer model involving video analysis or generation.

For audio processing requirements, the computing system 900 may feature an audio processing unit 932. The audio processing unit 932 may handle tasks such as audio encoding, decoding, and signal processing, which may be applicable in scenarios where the privacy-preserving transformer model deals with speech or audio data.

The computing system 900 may be equipped with a network interface device 908, enabling communication with external systems and networks. The network interface device 908 may facilitate the exchange of data, model updates, and other information crucial for the distributed operation of the privacy-preserving transformer model. In some cases, the network interface device 908 may connect to a network 920, which may represent local area networks, wide area networks, or the internet.

For user interaction, the computing system 900 may include several input/output devices. A video display unit 910 may provide visual output, potentially displaying model results, privacy metrics, or system status information. An alphanumeric input device 912, such as a keyboard, may allow users to input commands and data. A cursor control device 914, like a mouse or touchpad, may enable navigation and selection within the system's user interface.

The computing system 900 may also feature a signal generation device 916, which may be used for generating control signals or alerts related to the operation of the privacy-preserving transformer model. In some cases, the signal generation device 916 may produce notifications about privacy budget status, key rotation events, or other critical system events.

For persistent storage of data and instructions, the computing system 900 may include a data storage device 918. The data storage device 918 may contain a machine readable medium 924, which may store instructions 926 for executing the various components and operations of the privacy-preserving transformer model system. In some cases, the machine readable medium 924 may be a non-volatile storage medium such as a solid-state drive or hard disk drive.

All components of the computing system 900 may be interconnected via the bus 930, which may facilitate the transfer of data, addresses, and control signals between the various components. The bus 930 may represent multiple physical or logical buses, implementing different protocols and specifications to optimize data transfer within the system.

The computing system 900 may provide the computational resources necessary for implementing the various components of the privacy-preserving transformer model system. For example, the processing device 902 may execute the operations of the input privacy layer 120, including the down projection module 121 and the noise addition module 123. The main memory 904 and data storage device 918 may store the weights and parameters of the transformer model, as well as the encryption keys and shares managed by the key management system 180.

The graphics processing unit 922 may accelerate certain matrix operations required by the execution system 130, potentially improving the overall performance of the model. The network interface device 908 may facilitate the distribution of key shares to blockchain addresses and the collection of signatures, as handled by the encryption system 140 and decryption system 150.

The video display unit 910 and alphanumeric input device 912 may provide an interface for system administrators to monitor and configure the privacy monitoring system 170, allowing them to adjust hyperparameters and review privacy metrics. The signal generation device 916 may be used to alert administrators about critical events, such as when the privacy budget module 173 detects that the privacy budget is nearing depletion.

In some cases, the computing system 900 may be distributed across multiple physical machines or virtual instances, with different components running on separate hardware to optimize performance and security. For example, the encryption system 140 and key management system 180 may be isolated on dedicated hardware with enhanced security measures to protect sensitive cryptographic operations.

The computing system 900 may be designed to provide the necessary computational power, storage capacity, and networking capabilities to support the complex operations of the privacy-preserving transformer model system, while maintaining the flexibility to adapt to evolving requirements and security challenges.

Figure 8:
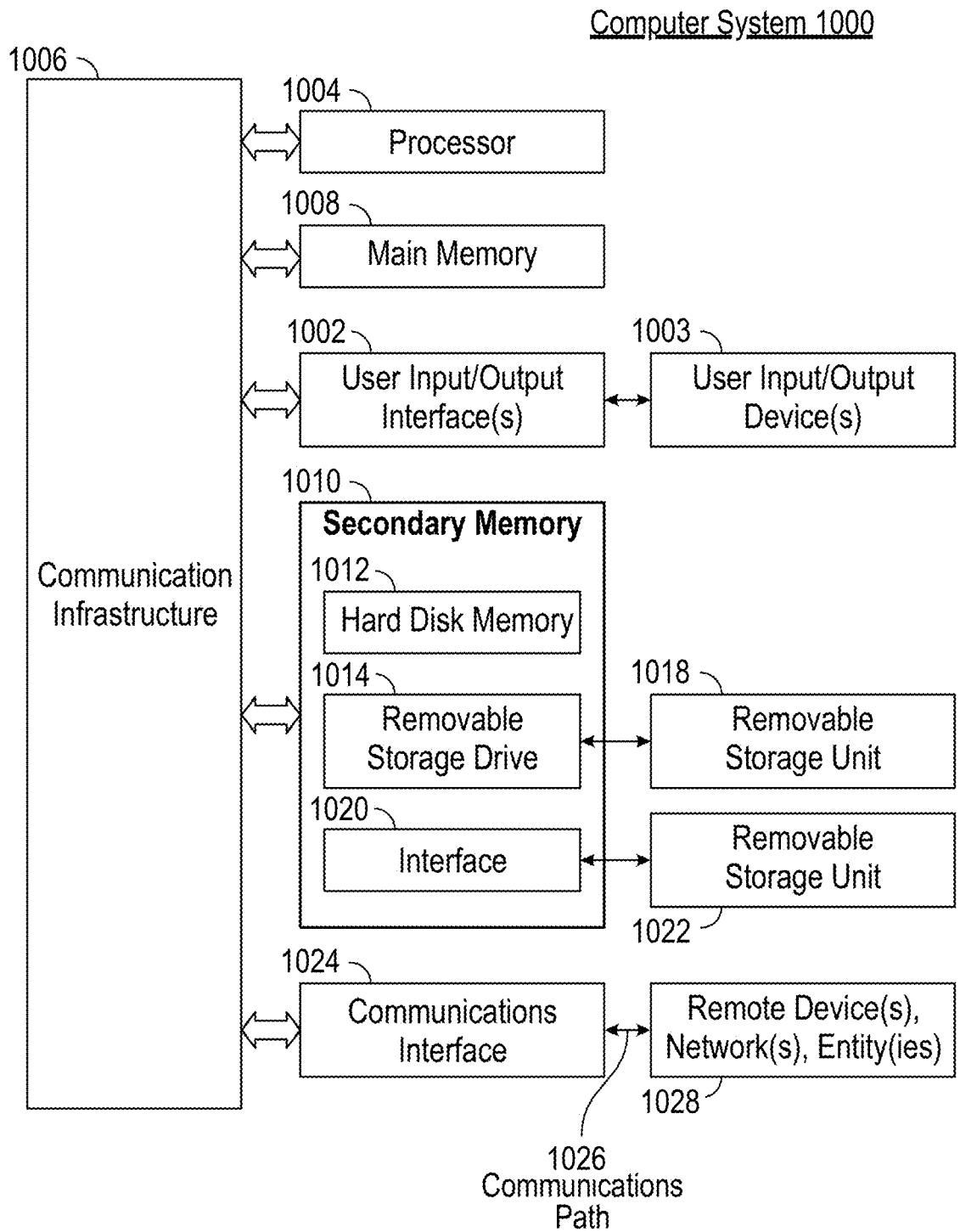
FIG. 8 illustrates a block diagram of a computer system, in accordance with example embodiments.

The privacy-preserving transformer model system may be implemented using a computer system 1000, as illustrated in FIG. 8. The computer system 1000 may provide the necessary computational resources and infrastructure to support the various components and operations of the privacy-preserving transformer model.

In some cases, the computer system 1000 may include a communication infrastructure 1006 that serves as the central backbone for data transfer and communication between various components. The communication infrastructure 1006 may facilitate the exchange of data, instructions, and control signals among the different elements of the computer system 1000.

A processor 1004 may be connected to the communication infrastructure 1006. The processor 1004 may be responsible for executing the instructions and algorithms associated with the privacy-preserving transformer model. In some cases, the processor 1004 may handle the computations required by the down projection module, the noise addition module, and other components of the input privacy layer.

The computer system 1000 may include a main memory 1008 connected to the communication infrastructure 1006. The main memory 1008 may store the instructions and data necessary for the immediate execution of the privacy-preserving transformer model. In some cases, the main memory 1008 may hold the current state of the model, including the weights of the input privacy layer and other model parameters.

A secondary memory 1010 may also be connected to the communication infrastructure 1006. The secondary memory 1010 may provide additional storage capacity and may comprise multiple components. In some cases, the secondary memory 1010 may include a hard disk memory 1012 for long-term storage of model checkpoints, training data, and other persistent information related to the privacy-preserving transformer model.

The secondary memory 1010 may also include a storage drive 1014. In some cases, the storage drive 1014 may be used to load or store data and programs related to the privacy-preserving transformer model. The storage drive 1014 may interact with a storage unit 1018 through an interface 1020. Additionally, a second storage unit 1022 may be connected through the interface 1020, providing further storage options for the computer system 1000.

An input output interface 1002 may be connected to the communication infrastructure 1006. The input output interface 1002 may facilitate interaction between the computer system 1000 and external devices or users. In some cases, the input output interface 1002 may be connected to an input output device 1003, allowing users to input data or commands and receive output from the privacy-preserving transformer model system.

The computer system 1000 may include a communications interface 1024 connected to the communication infrastructure 1006. The communications interface 1024 may enable the computer system 1000 to communicate with external systems or networks. In some cases, the communications interface 1024 may establish a communications path 1026 to a remote device 1028. This capability may be particularly relevant for distributed implementations of the privacy-preserving transformer model or for scenarios where key shares are distributed among blockchain addresses.

The computer system 1000 may support the various components of the privacy-preserving transformer model system. For instance, the execution system may utilize the processor 1004 and main memory 1008 to perform the core computations of the transformer model. The encryption system, including the key generation module, key splitting module, and weight encryption module, may leverage the processor 1004 and potentially specialized cryptographic hardware to perform secure operations.

The decryption system, comprising the signature collection module, signature verification module, and weight decryption module, may utilize the communications interface 1024 to interact with blockchain addresses and verify signatures. The actual decryption processes may be executed by the processor 1004 with data stored in the main memory 1008 or secondary memory 1010.

The model update system may use the processor 1004 and main memory 1008 to incorporate decrypted weights into the transformer model. The privacy monitoring system, including the metrics tracking module, hyperparameter adjustment module, and privacy budget module, may continuously analyze and adjust model parameters using the computational resources of the computer system 1000.

The key management system, with its key rotation module, transition management module, and secure destruction module, may utilize various components of the computer system 1000. For example, the secure destruction module may employ specialized techniques to overwrite data in the main memory 1008 or secondary memory 1010, ensuring that old encryption keys are irrecoverable.

In some cases, the computer system 1000 may be distributed across multiple physical or virtual machines to handle the computational demands of the privacy-preserving transformer model. The communications interface 1024 and communications path 1026 may facilitate coordination between these distributed components, ensuring seamless operation of the entire system.

The computer system 1000 may provide the necessary computational power, storage capacity, and communication capabilities to implement and operate the privacy-preserving transformer model system effectively. By leveraging the various components of the computer system 1000, the privacy-preserving transformer model may achieve its goals of secure data processing, privacy preservation, and efficient model updates while maintaining the flexibility to adapt to changing requirements and security needs.

The privacy-preserving transformer model system described herein may provide a comprehensive solution for processing and analyzing data while maintaining strong privacy guarantees. By incorporating advanced cryptographic techniques, dimensionality reduction, and blockchain-based key management, the system may offer a robust framework for secure and privacy-aware artificial intelligence applications.

The system's architecture may allow for the processing of sensitive data through multiple stages, each enhancing privacy protections. The input privacy layer may serve as a critical component, applying dimensionality reduction and noise addition to input data before it enters the main execution layer of the transformer model. This approach may help limit the amount of identifiable information that can be extracted from the processed data.

The encryption and key management mechanisms employed by the system may provide an additional layer of security for model weights and parameters. By utilizing a threshold signature scheme and distributing key shares across multiple blockchain addresses, the system may ensure that no single entity has unilateral control over the decryption process. This approach may enhance the overall security of the model and protect against unauthorized access or tampering.

The adaptive nature of the system, facilitated by components such as the privacy monitoring system and hyperparameter adjustment module, may allow for dynamic balancing of privacy preservation and model utility. This flexibility may enable the system to maintain optimal performance while adhering to specified privacy budgets and accuracy thresholds.

The modular design of the system may allow for its application across various domains where data privacy is paramount, such as healthcare, finance, and government. The ability to distribute operations across different environments (on-premises, in-region, and cloud) may provide additional flexibility in meeting diverse regulatory and compliance requirements.

In some cases, the system may be extended to support federated learning scenarios, where multiple parties can collaborate on model training without directly sharing their sensitive data. The privacy-preserving techniques employed by the system may facilitate such collaborative efforts while minimizing the risk of data leakage or inference attacks.

The integration of blockchain technology for key management may open up possibilities for decentralized governance of AI models. This approach may enable the creation of consortiums or decentralized autonomous organizations (DAOs) that collectively manage and oversee the deployment of privacy-preserving AI systems.

Future enhancements to the system may include the incorporation of advanced privacy-preserving techniques such as fully homomorphic encryption or secure multi-party computation. These additions may further expand the system's capabilities in processing encrypted data without decryption, potentially enabling even stronger privacy guarantees.

The privacy-preserving transformer model system may represent a significant step towards reconciling the power of advanced AI models with the growing need for data privacy and protection. By providing a comprehensive framework for secure and privacy-aware AI processing, the system may contribute to the development of trustworthy and responsible artificial intelligence technologies.

Throughout this disclosure, various terms and phrases are used to describe features of the disclosed technology. It is to be understood that these terms and phrases may encompass a variety of meanings and definitions, as is common in the field of technology and patent law. The definitions of these terms may vary depending on the context in which they are used, the specific embodiment being described, or the interpretation of the technology by those skilled in the art.

In various embodiments, certain variable names, symbols, or labels may be used in the claims to represent various elements, components, or steps of the described methods, systems, and apparatuses. These variable names, symbols, or labels are provided for convenience and clarity in describing the claimed subject matter. However, it should be understood that the use of such variable names, symbols, or labels in the claims does not necessarily limit these elements, components, or steps to being the same specific entities described in the specification or in other parts of the disclosure. The variable names, symbols, or labels used in the claims should be interpreted broadly and may encompass various implementations, variations, or equivalents of the described elements, components, or steps, unless explicitly stated otherwise or clearly limited by the context of the claim. As such, the scope of the claims is not confined to the specific examples or embodiments described in the specification, but rather extends to the full breadth of the inventive concepts disclosed herein.

For instance, terms such as "computing device," "processor," "memory," and "network" may refer to a wide range of devices, components, systems, and configurations known in the art, and their specific definitions may differ based on the implementation or design of the system. Similarly, phrases like "securely storing," "computing a vector," and "generating a message" may involve various methods, techniques, and processes that achieve the same or similar outcomes but may be executed in different manners.

It is also to be understood that the use of terms in the singular or plural form is not intended to limit the scope of the claims. For example, the mention of "a computing device" does not preclude the presence of multiple computing devices within a system. Likewise, references to "a network" may include various interconnected networks or a single network comprising multiple segments or layers.

Furthermore, the use of the term "may" in relation to an action or feature indicates that the action or feature is possible, but not necessarily mandatory. This term is used to describe optional or alternative aspects of the disclosed technology that provide flexibility in how the technology may be implemented or utilized.

The definitions provided herein are intended to serve as examples and are not exhaustive. Those skilled in the art may ascribe different meanings to these terms based on the context, the specific technology being described, or the advancements in the field. Therefore, the definitions of the terms and phrases used in this disclosure and the claims are to be interpreted broadly and in a manner consistent with the understanding of those skilled in the relevant art.

The use of the word "a" or "an" when used in conjunction with the claims herein is to be interpreted as including one or more than one of the element it introduces. Similarly, the use of the term "or" is intended to be inclusive, such that the phrase "A or B" is intended to include A, B, or both A and B, unless explicitly stated otherwise.

Reference throughout the specification to "one embodiment," "another embodiment," "an embodiment," and so forth, means that a particular feature, structure, or characteristic described in connection with the embodiment is included in at least one embodiment of the present disclosure, and may not necessarily be present in all embodiments. Furthermore, the particular features, structures, or characteristics may be combined in any suitable manner in one or more embodiments without limitation.

The use of the terms "first," "second," and the like does not imply any order or sequence, but are used to distinguish one element from another, and the terms "top," "bottom," "front," "back," "leading," "trailing," and the like are used for descriptive purposes and are not necessarily to be construed as limiting.

As used herein, the term "processor" refers to any computing entity capable of executing instructions to perform a specific set of operations, whether implemented in hardware, firmware, software, or any combination thereof. This definition includes, but is not limited to, the following types of processors: Central Processing Unit (CPU), Graphics Processing Unit (GPU), Digital Signal Processor (DSP), Field-Programmable Gate Array (FPGA), Application-Specific Integrated Circuit (ASIC), microcontroller, System on Chip (SoC), Neural Processing Unit (NPU), quantum processor, cloud-based and distributed processors, multi-core and parallel processors, and virtual processors. The term "processor" also encompasses the associated memory hierarchies, including primary memory (such as RAM), secondary storage (such as hard drives and SSDs), and cache memory, which work in conjunction with the processor to store and retrieve data necessary for executing instructions. In this patent application, any reference to a "processor" should be interpreted broadly to include any type of processing unit capable of performing the described functions, regardless of its specific implementation, architecture, or physical form.

As used herein, the term "messages" may refer to any form of data or information that can be processed, transmitted, or stored in a digital format. Messages may include, but are not limited to, arbitrary-length plaintext messages, pre-hashed messages, concatenated messages, binary data, network protocol messages, database records, and time-stamped messages. Messages may be composed of characters, symbols, or binary data and may represent various forms of content such as text, numbers, multimedia, executable code, or any other data that can be digitally encoded. Messages may be used as input for cryptographic functions, such as keyed hash functions, where they are transformed into a fixed-size hash value influenced by a secret cryptographic key. The term "messages" encompasses a wide range of data types and structures, from simple text strings to complex structured data, and may include metadata, headers, footers, or other information that facilitates the processing, transmission, or interpretation of the content. Messages may be generated by users, systems, or processes and may be intended for various purposes, including communication, authentication, verification, logging, or any other function that involves the use of digital data.

The term "database" should be construed to mean a blockchain, distributed ledger technology, key-value store, document-oriented database, graph database, time-series database, in-memory database, columnar database, object-oriented database, hierarchical database, network database, or any other structured data storage system capable of storing and retrieving information. This may include traditional relational database management systems (RDBMS), NoSQL databases, NewSQL databases, or hybrid database systems that combine multiple database paradigms. The database may be centralized, distributed, or decentralized, and may employ various data models, indexing strategies, and query languages to organize and access the stored information. It may also incorporate features such as ACID (Atomicity, Consistency, Isolation, Durability) compliance, eventual consistency, sharding, replication, or partitioning to ensure data integrity, availability, and scalability. The database may be hosted on-premises, in the cloud, or in a hybrid environment, and may support various access methods including direct queries, API calls, or event-driven architectures.

The terms "connected," "coupled," or any variant thereof, mean any direct or indirect connection or coupling between two or more elements, and may encompass the presence of one or more intermediate elements between the two elements that are connected or coupled to each other.

The description of the embodiments of the present disclosure is intended to be illustrative, and not to limit the scope of the claims. Many alternatives, modifications, and variations will be apparent to those skilled in the art. A number of implementations have been described. Nevertheless, it will be understood that various modifications may be made without departing from the spirit and scope of the disclosure. Accordingly, other implementations are within the scope of the following claims.

The invention claimed is:

1. A computerized method for implementing a privacy-preserving transformer model with secure key management comprising:
   receiving input data for processing by a transformer model from a computerized storage device;
   using a computerized processor, applying a dimensionality reduction operation to the input data using an input privacy layer positioned horizontally between an input layer and an execution layer of the transformer model, wherein the input privacy layer comprises:
   a down projection operation to compress the input data from a higher dimension of size N to a lower dimension of size M, where M<N,
   a transformation operation in the lower dimension, and
   an up projection operation to reconstruct the input data back to the higher dimension of size N;
   wherein the input privacy layer positioned horizontally between the input layer and the execution layer is configured for:
   applying privacy-preserving transformations across a plurality of input features;
   processing one or more batches of input data through the input privacy layer in parallel, and
   separating the privacy-preserving computations from main execution logic of the transformer model,
   processing the reconstructed input data through at least a portion of the execution layer of the transformer model;
   generating an encryption key for encrypting weights of the input privacy layer using a cryptographically secure random number generator;
   splitting the encryption key into K shares using a secret sharing scheme, where K is an integer greater than 1;
   distributing the K shares among K distinct blockchain addresses;
   encrypting individual key shares of the K shares using public keys of their corresponding blockchain addresses before transmission;
   encrypting the weights of the input privacy layer using the encryption key;
   receiving a set of T signatures corresponding to T distinct blockchain addresses from the K distinct blockchain addresses, where T is an integer less than or equal to K and greater than or equal to a predefined threshold;
   reconstructing the encryption key using the received T signatures and their corresponding shares through polynomial interpolation;
   verifying the authenticity of each signature of the T signatures using a corresponding blockchain address's public key;
   decrypting the weights of the input privacy layer using the reconstructed encryption key only if all T signatures are successfully verified; and
   updating the transformer model by replacing original weights of the input privacy layer with the decrypted weights; and
   protecting against tampering of the transformer model by utilizing the secret sharing scheme and the blockchain addresses.

2. The computerized method of claim 1, wherein positioning the input privacy layer horizontally between the input layer and the execution layer comprises:
   processing all input data through the input privacy layer before passing the reconstructed data to any subsequent layers of the transformer model.

3. The computerized method of claim 1, wherein the input privacy layer positioned horizontally between the input layer and the execution layer maintains the same input and output dimensionality as the input layer.

4. The computerized method of claim 1, wherein the input privacy layer is configured to apply the privacy-preserving transformations uniformly across all input features.

5. The computerized method of claim 1, wherein the input privacy layer further comprises a noise addition operation applied to the compressed data in the lower dimension, the noise addition operation configured to:
   generate Gaussian noise scaled based on a current privacy budget;
   add the scaled noise to the compressed data; and
   dynamically adjust the noise scale as the privacy budget is consumed during model training or inference.

6. The computerized method of claim 1, wherein the input privacy layer is configured to adaptively adjust the size M of the lower dimension based on:
   a current privacy budget;
   a target accuracy threshold for the transformer model; and
   a computational resource constraint,
   wherein the size M is decreased to enhance privacy when the privacy budget is low or the accuracy is above the target threshold, and increased to preserve more information when the privacy budget is high or the accuracy falls below the target threshold.

7. The computerized method of claim 1, further comprising:
   monitoring privacy metrics for the input privacy layer during training and inference, the privacy metrics including at least one of:
   a compression ratio between N and M;
   a reconstruction error between the input data and the reconstructed data;
   a privacy budget consumption rate; and
   a noise magnitude added in the lower dimension;
   adjusting hyperparameters of the input privacy layer based on the monitored privacy metrics to maintain a desired privacy-utility trade-off; and
   storing the privacy metrics and corresponding model performance data to inform future input privacy layer configurations.

8. The computerized method of claim 1, wherein generating the encryption key further comprises:
   deriving the encryption key from a random seed using a key derivation function; and
   storing metadata about the key generation process in a secure enclave.

9. The computerized method of claim 1, wherein splitting the encryption key into K shares uses Shamir's Secret Sharing scheme, and further comprises:
   selecting a polynomial of degree T−1, where T is the predefined threshold;
   setting the constant term of the polynomial to be the encryption key;
   generating K points on the polynomial to create the K shares; and
   associating each share with a unique identifier.

10. The computerized method of claim 1, wherein distributing the K shares among K distinct blockchain addresses further comprises:
    transmitting the encrypted shares through a secure communication channel;
    storing a mapping between share identifiers and blockchain addresses in a distributed ledger; and
    implementing a time-lock mechanism that prevents share retrieval before a specified time.

11. The computerized method of claim 1, wherein reconstructing the encryption key comprises:
    verifying that the number of received signatures meets or exceeds the predefined threshold T;
    validating each signature using the public key of the corresponding blockchain address;
    retrieving the encrypted shares associated with the verified signatures;
    decrypting the shares using the private keys of the participating blockchain addresses; and
    applying Lagrange interpolation to the decrypted shares to reconstruct the original encryption key.

12. The computerized method of claim 1, further comprising:
    implementing a key rotation protocol for the encryption key, wherein:
    a new encryption key is generated and split into shares at predefined intervals;
    the new shares are distributed to the blockchain addresses;
    a transition period is established where both the old and new encryption keys are valid;
    the weights of the input privacy layer are re-encrypted using the new encryption key; and
    the old encryption key and its shares are securely destroyed after the transition period.

13. The computerized method of claim 1, further comprising distributing operations across at least three distinct regions to comply with sovereign data requirements, the method further comprising:
    performing, in an on-premises environment:
       storing and processing raw input data;
       generating initial embeddings from the raw input data; and
       applying preliminary privacy-preserving transformations to the initial embeddings;
    executing, in a sovereign-compliant regional environment:
       receiving the privacy-preserved embeddings from the on-premises environment;
       applying the dimensionality reduction operation using the input privacy layer;
       processing the reconstructed data through at least a portion of the execution layer;
       generating the encryption key for the input privacy layer weights;
       splitting the encryption key into K shares;
       encrypting the weights of the input privacy layer; and
       storing the encrypted weights and key shares;
    and conducting, in a separate cloud environment not controlled by the sovereign entity:
       receiving the processed data from the sovereign-compliant regional environment;
       completing any remaining execution layer processing;
       distributing the K shares among K distinct blockchain addresses;
       collecting the set of T signatures from the blockchain addresses;
       reconstructing the encryption key using the received signatures and shares;
       verifying the authenticity of each signature;
       decrypting the weights of the input privacy layer; and
       updating the transformer model with the decrypted weights.

14. A system comprising:
a processor; and
a memory storing instructions that, when executed by the processor, cause the system to:
- receive input data for processing by a transformer model from a computerized storage device;
- apply a dimensionality reduction operation to the input data using an input privacy layer positioned horizontally between an input layer and an execution layer of the transformer model, wherein the input privacy layer comprises:
  - a down projection operation to compress the input data from a higher dimension of size N to a lower dimension of size M, where M<N,
  - a transformation operation in the lower dimension, and
  - an up projection operation to reconstruct the input data back to the higher dimension of size N;
- wherein the input privacy layer positioned horizontally between the input layer and the execution layer is configured for:
  - applying privacy-preserving transformations across a plurality of input features;
  - processing one or more batches of input data through the input privacy layer in parallel, and
  - separating the privacy-preserving computations from main execution logic of the transformer model,
- process the reconstructed data through the execution layer of the transformer model;
- generate an encryption key for encrypting weights of the input privacy layer using a cryptographically secure random number generator;
- split the encryption key into K shares using a secret sharing scheme, where K is an integer greater than 1;
- distribute the K shares among K distinct blockchain addresses;
- encrypt individual key shares of the K shares using public keys of their corresponding blockchain addresses before transmission;
- encrypt the weights of the input privacy layer using the encryption key;
- receive a set of T signatures corresponding to T distinct blockchain addresses from the K distinct blockchain addresses, where T is an integer less than or equal to K and greater than or equal to a predefined threshold;
- reconstruct the encryption key using the received T signatures and their corresponding shares through polynomial interpolation;
- verify the authenticity of each signature using the corresponding blockchain address's public key;
- decrypt the weights of the input privacy layer using the reconstructed encryption key only if all T signatures are successfully verified; and
- update the transformer model by replacing original weights of the input privacy layer with the decrypted weights; and
- protect against tampering of the transformer model by utilizing the secret sharing scheme and the blockchain addresses.

15. The system of claim 14, wherein the memory stores further instructions that, when executed by the processor, cause the system to process all input data through the input privacy layer before passing the reconstructed data to any subsequent layers of the transformer model.

16. The system of claim 14, wherein the input privacy layer positioned horizontally between the input layer and the execution layer maintains the same input and output dimensionality as the input layer.

17. The system of claim 14, wherein the memory stores further instructions that, when executed by the processor, cause the system to apply the privacy-preserving transformations uniformly across all input features.

18. The system of claim 14, wherein the input privacy layer further comprises a noise addition operation applied to the compressed data in the lower dimension, the noise addition operation configured to:
- generate Gaussian noise scaled based on a current privacy budget;
- add the scaled noise to the compressed data; and
- dynamically adjust the noise scale as the privacy budget is consumed during model training or inference.

19. The system of claim 14, wherein the input privacy layer is configured to adaptively adjust the size M of the lower dimension based on:
- a current privacy budget;
- a target accuracy threshold for the transformer model; and
- a computational resource constraint,
- wherein the size M is decreased to enhance privacy when the privacy budget is low or the accuracy is above the target threshold, and increased to preserve more information when the privacy budget is high or the accuracy falls below the target threshold.

20. The system of claim 14, wherein the memory stores further instructions that, when executed by the processor, cause the system to:
- monitor privacy metrics for the input privacy layer during training and inference, the privacy metrics including at least one of:
  - a compression ratio between N and M;
  - a reconstruction error between the input data and the reconstructed data;
  - a privacy budget consumption rate; and
  - a noise magnitude added in the lower dimension;
- adjust hyperparameters of the input privacy layer based on the monitored privacy metrics to maintain a desired privacy-utility trade-off; and
- store the privacy metrics and corresponding model performance data to inform future input privacy layer configurations.

21. The system of claim 14, wherein the memory stores further instructions that, when executed by the processor, cause the system to:
- generate a random seed using the cryptographically secure random number generator;
- derive the encryption key from the random seed using a key derivation function; and
- store metadata about the key generation process in a secure enclave.

22. The system of claim 14, wherein the memory stores further instructions that, when executed by the processor, cause the system to:
- perform, in an on-premises environment:
  - storing and processing raw input data;
  - generating initial embeddings from the raw input data; and
  - applying preliminary privacy-preserving transformations to the initial embeddings;
- execute, in a sovereign-compliant regional environment:
  - receiving the privacy-preserved embeddings from the on-premises environment;

applying the dimensionality reduction operation using the input privacy layer;

processing the reconstructed data through at least a portion of the execution layer;

generating the encryption key for the input privacy layer weights;

splitting the encryption key into K shares;

encrypting the weights of the input privacy layer; and storing the encrypted weights and key shares;

and conduct, in a separate cloud environment not controlled by the sovereign entity:

receiving the processed data from the sovereign-compliant regional environment;

completing any remaining execution layer processing;

distributing the K shares among K distinct blockchain addresses;

collecting the set of T signatures from the blockchain addresses;

reconstructing the encryption key using the received signatures and shares;

verifying the authenticity of each signature;

decrypting the weights of the input privacy layer; and updating the transformer model with the decrypted weights.

23. The system of claim 14, wherein the memory stores further instructions that, when executed by the processor, cause the system to split the encryption key using Shamir's Secret Sharing scheme by:

selecting a polynomial of degree T−1, where T is the predefined threshold;

setting the constant term of the polynomial to be the encryption key;

generating K points on the polynomial to create the K shares; and associating each share with a unique identifier.

24. The system of claim 14, wherein the memory stores further instructions that, when executed by the processor, cause the system to distribute the K shares among K distinct blockchain addresses by:

transmitting the encrypted shares through a secure communication channel;

storing a mapping between share identifiers and blockchain addresses in a distributed ledger; and implementing a time-lock mechanism that prevents share retrieval before a specified time.

25. The system of claim 14, wherein the memory stores further instructions that, when executed by the processor, cause the system to reconstruct the encryption key by:

verifying that the number of received signatures meets or exceeds the predefined threshold T;

validating each signature using the public key of the corresponding blockchain address;

retrieving the encrypted shares associated with the verified signatures;

decrypting the shares using the private keys of the participating blockchain addresses; and applying Lagrange interpolation to the decrypted shares to reconstruct the original encryption key.

26. The system of claim 14, wherein the memory stores further instructions that, when executed by the processor, cause the system to:

implement a key rotation protocol for the encryption key, wherein:

a new encryption key is generated and split into shares at predefined intervals;

the new shares are distributed to the blockchain addresses;

a transition period is established where both the old and new encryption keys are valid;

the weights of the input privacy layer are re-encrypted using the new encryption key; and the old encryption key and its shares are securely destroyed after the transition period.

27. The system of claim 14, further comprising:

a network interface configured to communicate with the blockchain addresses; and a secure hardware element configured to store cryptographic keys and perform cryptographic operations.

28. A non-transitory computer-readable medium storing instructions that, when executed by a processor, cause the processor to perform operations comprising:

receiving input data for processing by a transformer model from a computerized storage device;

applying a dimensionality reduction operation to the input data using an input privacy layer positioned horizontally between an input layer and an execution layer of the transformer model, wherein the input privacy layer comprises:

a down projection operation to compress the input data from a higher dimension of size N to a lower dimension of size M, where M<N, a transformation operation in the lower dimension, and an up projection operation to reconstruct the input data back to the higher dimension of size N;

wherein the input privacy layer positioned horizontally between the input layer and the execution layer is configured for:

applying privacy-preserving transformations across a plurality of input features;

processing one or more batches of input data through the input privacy layer in parallel, and separating the privacy-preserving computations from main execution logic of the transformer model, processing the reconstructed data through the execution layer of the transformer model;

generating an encryption key for encrypting weights of the input privacy layer using a cryptographically secure random number generator;

splitting the encryption key into K shares using a secret sharing scheme, where K is an integer greater than 1;

distributing the K shares among K distinct blockchain addresses;

encrypting individual key shares of the K shares using public keys of their corresponding blockchain addresses before transmission;

encrypting the weights of the input privacy layer using the encryption key;

receiving a set of T signatures corresponding to T distinct blockchain addresses from the K distinct blockchain addresses, where T is an integer less than or equal to K and greater than or equal to a predefined threshold;

reconstructing the encryption key using the received T signatures and their corresponding shares through polynomial interpolation;

verifying the authenticity of each signature using the corresponding blockchain address's public key;

decrypting the weights of the input privacy layer using the reconstructed encryption key only if all T signatures are successfully verified; and updating the transformer model by replacing original weights of the input privacy layer with the decrypted weights; and protecting against tampering of the transformer model by utilizing the secret sharing scheme and the blockchain addresses.

29. The non-transitory computer-readable medium of claim 28, wherein the operations further comprise:
monitoring privacy metrics for the input privacy layer during training and inference, the privacy metrics including at least one of:
  a compression ratio between N and M;
  a reconstruction error between the input data and the reconstructed data;
  a privacy budget consumption rate; and
  a noise magnitude added in the lower dimension;
adjusting hyperparameters of the input privacy layer based on the monitored privacy metrics to maintain a desired privacy-utility trade-off; and
storing the privacy metrics and corresponding model performance data to inform future input privacy layer configurations.

30. The non-transitory computer-readable medium of claim 28, wherein the input privacy layer is configured to adaptively adjust the size M of the lower dimension based on:
  a current privacy budget;
  a target accuracy threshold for the transformer model; and
  a computational resource constraint,
  wherein the size M is decreased to enhance privacy when the privacy budget is low or the accuracy is above the target threshold, and increased to preserve more information when the privacy budget is high or the accuracy falls below the target threshold.

* * * * *